US011430213B2

(12) United States Patent
Tsushima

(10) Patent No.: US 11,430,213 B2
(45) Date of Patent: Aug. 30, 2022

(54) INFORMATION PROCESSING DEVICE, INFORMATION PROCESSING METHOD, AND STORAGE MEDIUM

(71) Applicant: HONDA MOTOR CO., LTD., Tokyo (JP)

(72) Inventor: Kosei Tsushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/892,329

(22) Filed: Jun. 4, 2020

(65) Prior Publication Data
US 2020/0394406 A1 Dec. 17, 2020

(30) Foreign Application Priority Data
Jun. 12, 2019 (JP) .............................. JP2019-109519

(51) Int. Cl.
| G06T 19/00 | (2011.01) |
| G06T 7/70 | (2017.01) |
| G06T 17/20 | (2006.01) |
| G06V 20/20 | (2022.01) |
| G06V 20/13 | (2022.01) |

(52) U.S. Cl.
CPC ............ *G06V 20/20* (2022.01); *G06T 19/006* (2013.01); *G06V 20/13* (2022.01)

(58) Field of Classification Search
CPC .............................................. G06K 9/00671
USPC ........................................................ 345/633
See application file for complete search history.

(56) References Cited

U.S. PATENT DOCUMENTS

| 6,222,583 B1* | 4/2001 | Matsumura ........ G01C 21/3635 |
| | | 345/619 |
| 9,098,223 B2* | 8/2015 | Shimizu ................ G06F 3/1292 |
| 9,473,923 B2* | 10/2016 | Jang ...................... H04W 8/005 |
| 2003/0013461 A1* | 1/2003 | Mizune ................. H04W 4/029 |
| | | 455/456.1 |

(Continued)

FOREIGN PATENT DOCUMENTS

| JP | 10-089980 | 4/1998 |
| JP | 10-267671 | 10/1998 |

(Continued)

OTHER PUBLICATIONS

Japanese Office Action for Japanese Patent Application No. 2019-109519 dated Jan. 4, 2022.

(Continued)

*Primary Examiner* — Javid A Amini
(74) *Attorney, Agent, or Firm* — Amin, Turocy & Watson, LLP

(57) ABSTRACT

An information processing device is configured to acquire a position of the information processing device and a position of a base station device, and to control a viewing device based on the position of the information processing device and the position of the base station device such that a user visually recognizes an image superimposed on a real space and indicating presence of the base station device or the user visually recognizes a real space image in which a base station image indicating the presence of the base station device is included in an image indicating the real space or a virtual reality image in which the real space is reproduced.

17 Claims, 15 Drawing Sheets

(56) References Cited

U.S. PATENT DOCUMENTS

| | | | |
|---|---|---|---|
| 2003/0032484 A1* | 2/2003 | Ohshima | A63F 13/10 463/43 |
| 2008/0111832 A1* | 5/2008 | Emam | G06F 3/04815 345/633 |
| 2010/0245387 A1* | 9/2010 | Bachelder | G06T 19/006 345/633 |
| 2011/0182250 A1* | 7/2011 | Shin | H04W 4/00 370/329 |
| 2012/0147040 A1 | 6/2012 | Yun | |
| 2013/0339864 A1 | 12/2013 | Uusitalo et al. | |
| 2015/0029220 A1 | 1/2015 | Hittel et al. | |
| 2017/0213390 A1* | 7/2017 | Ramachandran | G06F 3/011 |
| 2017/0215093 A1 | 7/2017 | Zhang et al. | |
| 2017/0253181 A1* | 9/2017 | Choi | B60K 35/00 |
| 2018/0083848 A1 | 3/2018 | Siddiqi et al. | |
| 2018/0123906 A1 | 5/2018 | Liao et al. | |
| 2018/0336728 A1 | 11/2018 | Edwards | |
| 2019/0311471 A1* | 10/2019 | Kurabayashi | G06T 19/006 |
| 2020/0357188 A1* | 11/2020 | Kurabayashi | G06K 19/06037 |

FOREIGN PATENT DOCUMENTS

| | | |
|---|---|---|
| JP | 2010-238098 | 10/2010 |
| JP | 2012-129996 | 7/2012 |
| JP | 2015-211251 | 11/2015 |
| JP | 2016-186431 | 10/2016 |
| JP | 2017-083446 | 5/2017 |
| JP | 2018-136137 | 8/2018 |
| JP | 2019-512769 | 5/2019 |
| WO | 2018/216053 | 11/2018 |

OTHER PUBLICATIONS

Chinese Office Action for Chinese Patent Application No. 202010509877.9 dated May 30, 2022.

Japanese Office Action for Japanese Patent Application No. 2019-109519 dated Jul. 5, 2022.

* cited by examiner

| BASE STATION DEVICE IDENTIFICATION INFORMATION | SSID | BASE STATION DEVICE POSITION INFORMATION | COMMUNICATION QUALITY INFORMATION (NUMBER OF CONNECTED DEVICES) | RADIO WAVE INTENSITY INFORMATION |
|---|---|---|---|---|
| *** | *** | (XX.XX, YYY.YY) | 3 (POOR) | WEAK |
| *** | *** | (XX.XX, YYY.YY) | 2 (MEDIUM) | MEDIUM |
| *** | *** | (XX.XX, YYY.YY) | 1 (GOOD) | STRONG |
| ... | ... | ... | ... | ... |

| GRAPHIC IMAGE INFORMATION |
|---|
| BASE STATION ICON |
| RADIO WAVE INTENSITY ICON |
| COMMUNICATION QUALITY ICON |
| ... |

| RADIO WAVE INTENSITY | SIZE OF RADIO WAVE INTENSITY ICON |
|---|---|
| STRONG | LARGE |
| MEDIUM | MEDIUM |
| WEAK | SMALL |
| COMMUNICATION QUALITY INFORMATION | COLOR OF COMMUNICATION QUALITY ICON |
| GOOD | DARK |
| MEDIUM | MEDIUM |
| POOR | LIGHT |
| ... | ... |

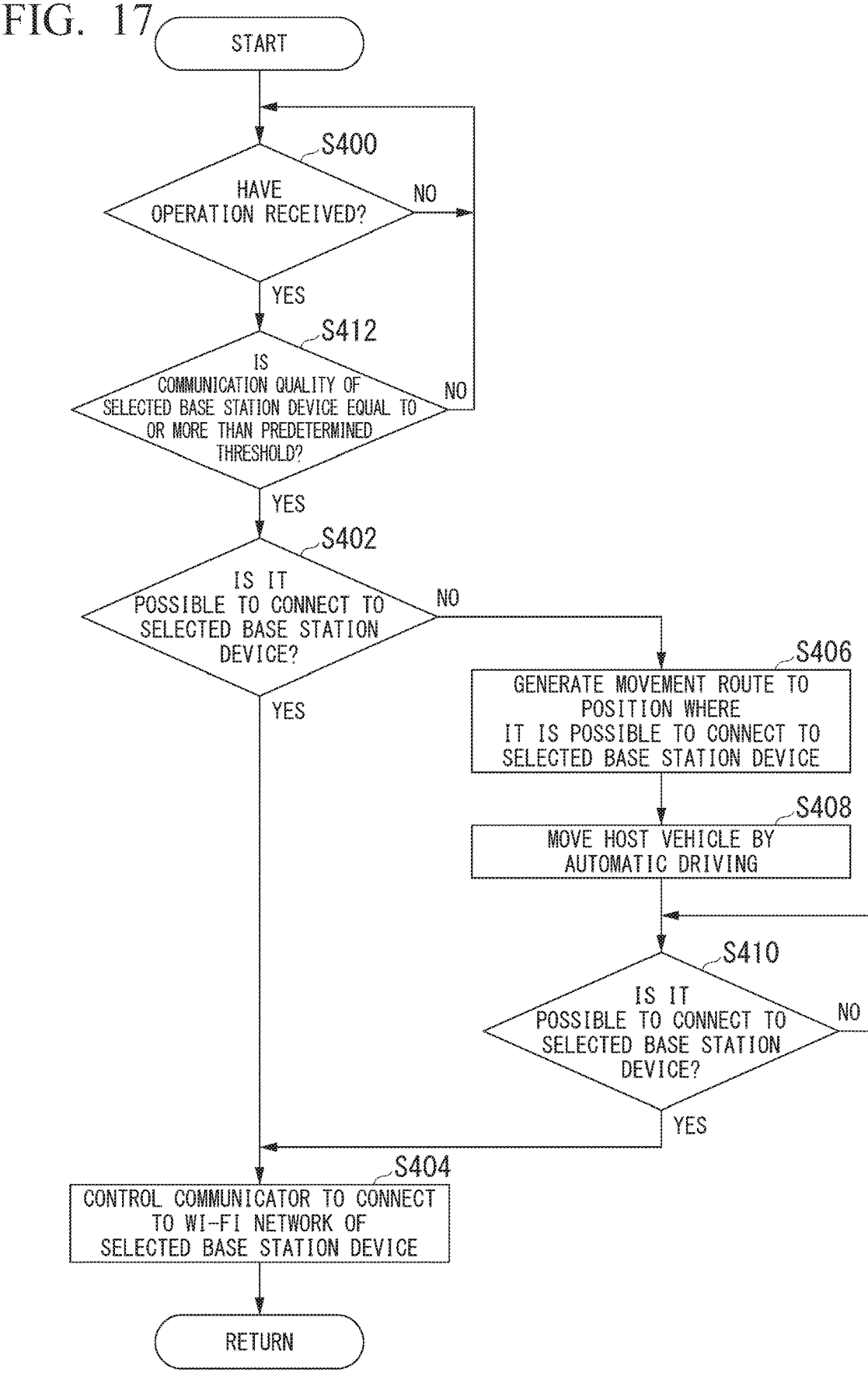

INFORMATION PROCESSING DEVICE, INFORMATION PROCESSING METHOD, AND STORAGE MEDIUM

CROSS-REFERENCE TO RELATED APPLICATION

Priority is claimed on Japanese Patent Application No. 2019-109519, filed Jun. 12, 2019, the content of which is incorporated herein by reference.

BACKGROUND

Field of the Invention

The present invention relates to an information processing device, an information processing method, and a storage medium.

Description of Related Art

In recent years, an augmented reality (AR) technology for superimposing and displaying an object image on a surrounding image acquired by a camera included in an information processing device has become known. In the related art, a service in which an object image indicating a so-called point of interest (POI) position is superimposed on a surrounding image and is provided to a user by using the AR technology has been disclosed (Japanese Unexamined Patent Application, First Publication No. 10-267671).

SUMMARY

There are cases where a user of an information processing device may intend to ascertain information on base station devices (access points) existing around the user in order to use a network via a Wi-Fi network provided by the base station devices such as when going out. However, it may be difficult to provide the user with the information on the base station devices in the related art.

The present invention is achieved in view of the problems described above, and one object of the present invention is to provide an information processing device, an information processing method, and a storage medium, by which it is possible to provide a user with information on a base station device.

An information processing device, an information processing method, and a storage medium according to the invention employ the following configurations.

(1) An information processing device of an aspect of the invention includes a storage device that stores a program, and one or more hardware processors, and, by the one or more hardware processors that execute the program stored in the storage device, the information processing device is configured to acquire a position of the information processing device and a position of a base station device, and to control a viewing device based on the position of the information processing device and the position of the base station device such that a user visually recognizes an image superimposed on a real space and indicating presence of the base station device or the user visually recognizes a real space image in which a base station image indicating the presence of the base station device is included in an image indicating the real space or a virtual reality image in which the real space is reproduced.

According to the aspect of (2), in the information processing device according to the aspect of (1), the one or more hardware processors generate the image or the base station image so as to indicate communication quality of communication provided by the base station device.

According to the aspect of (3), in the information processing device according to the aspect of (2), the one or more hardware processors treat the number of terminal devices connected to the base station device as information indicating the communication quality, and generate the image or the base station image.

According to the aspect of (4), in the information processing device according to the aspect of (1), the one or more hardware processors generate the image or the base station image in the form of a graphic in correspondence to each of a plurality of base station devices.

According to the aspect of (5), in the information processing device according to the aspect of (4), the one or more hardware processors generate the graphic in a form according to communication quality of communication provided by the plurality of base station devices.

According to the aspect of (6), in the information processing device according to the aspect of (4), the one or more hardware processors further derive a distance between the position of the base station device and the position of the information processing device, and make the graphic large as the distance is shorter.

Aspect of (7) is that the information processing device according to the aspect (1) further includes an imager configured to generate a surrounding image by imaging surroundings of the information processing device, and the viewing device includes a display, and displays an image, in which the image is superimposed on the surrounding image generated by the imager, or the real space image in which the base station image is included in the surrounding image.

According to the aspect of (8), in the information processing device according to the aspect of (7), the one or more hardware processors specify the position of the base station device in the surrounding image based on the position of the base station device and an orientation of the information processing device, and allow the display to display an image, in which the image is displayed at the specified position of the base station device in the surrounding image, or the real space image in which the base station image is included at the specified position of the base station device.

Aspect of (9) is that the information processing device according to the aspect (1) further includes a receiver configured to receive an operation of a user, and a communicator configured to communicate with another device via a base station device, and, based on an operation of selecting the image received by the receiver, the one or more hardware processors control the communicator to connect to the base station device corresponding to the selected image or the base station image.

Aspect of (10) is that the information processing device according to the aspect (1) further includes a receiver configured to receive an operation of the user, and, based on an operation of selecting the image received by the receiver or the base station image, the one or more hardware processors generate a movement route to the position of the base station device corresponding to the selected image or the base station image.

Aspect of (11) is that the information processing device according to the aspect (1) further includes a receiver configured to receive an operation of the user, and a communicator configured to communicate with another device via a base station device, and the one or more hardware processors control the communicator, generate a movement route to the position of the base station device corresponding to the image, control the communicator to connect to the base station device corresponding to the selected image or the base station image based on an operation of selecting the image received by the receiver or the base station image when communication quality of communication provided by the selected base station device is equal to or more than a predetermined threshold, and generate the movement route to the position of the selected base station device based on the operation of selecting the image received by the receiver or the base station image when the communication quality of the communication provided by the selected base station device is under the predetermined threshold.

(12) An information processing method of another aspect of the invention is implemented by a computer performing the steps of acquiring a position of the information processing device, acquiring a position of a base station device, and controlling a viewing device based on the acquired position of the information processing device and the acquired position of the base station device such that a user visually recognizes an image superimposed on a real space and indicating presence of the base station device or the user visually recognizes a real space image in which a base station image indicating the presence of the base station device is included in an image indicating the real space or a virtual reality image in which the real space is reproduced.

(13) A storage medium of another aspect of the invention stores a program causing a computer to perform the steps of acquiring a position of the information processing device, acquiring a position of a base station device, and controlling a viewing device based on the acquired position of the information processing device and the acquired position of the base station device such that a user visually recognizes an image superimposed on a real space and indicating presence of the base station device or the user visually recognizes a real space image in which a base station image indicating the presence of the base station device is included in an image indicating the real space or a virtual reality image in which the real space is reproduced.

According to the aspects of (1) to (13), it is possible to provide a user with information on a base station device.

According to the aspects of (2) to (6), it is possible to provide the user with information on communication quality of communication via a base station device in an easy-to-understand manner.

According to the aspect of (9), it is possible to allow the user to easily use communication via a base station device.

According to the aspect of (10), it is possible to guide the user to a base station device that the user desires to use.

According to the aspect of (11), it is possible to allow the user to easily use communication via a base station device and to guide the user to a position where the communication via the base station device is easily used.

BRIEF DESCRIPTION OF THE DRAWINGS

FIG. 5 is a diagram illustrating an example of the content of graphic information.

FIG. 6 is a diagram illustrating an example of the content of communication quality correspondence information.

FIG. 17 is a flowchart illustrating an example of a process in which a communication controller controls a communicator based on the communication quality of a base station device.

DESCRIPTION OF EMBODIMENTS

Hereinafter, embodiments of an information processing device, an information processing method, and a storage medium of the present invention will be described with reference to the drawings.

First Embodiment

Overview of Information Providing System 1

Figure 1:
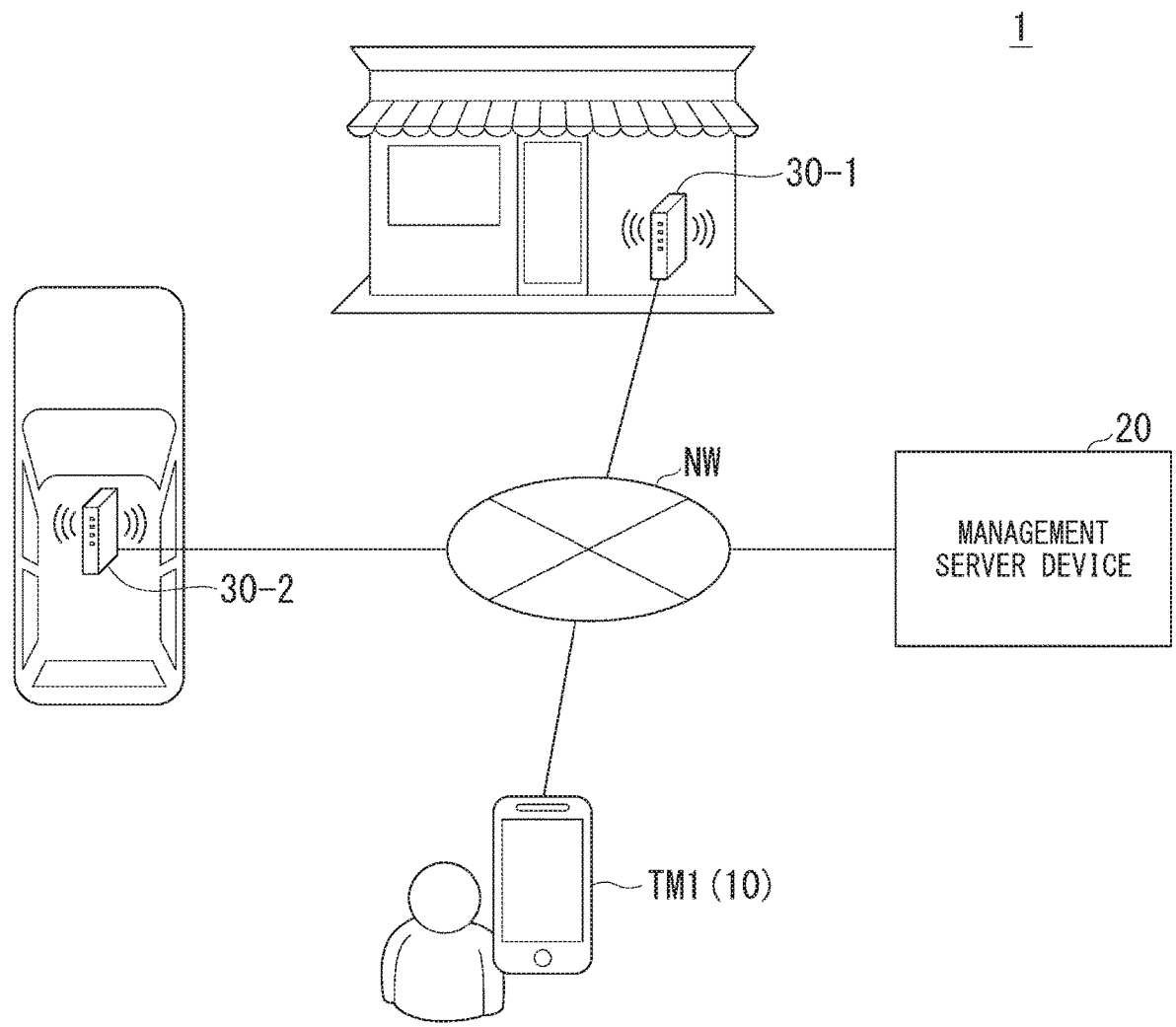
FIG. 1 is a diagram illustrating an overview of an information providing system using an information processing device of a first embodiment.

FIG. 1 is a diagram illustrating an overview of the information providing system 1 using an information processing device 10 of the first embodiment. The information providing system 1 is a system that provides information on a wireless communication network to an owner (hereinafter, a user) of an information terminal device TM1. The information providing system 1 includes, for example, one or more information terminal devices TM1, a management server device 20, and one or more base station devices 30 (illustrated base station devices 30-1 and 30-2). The information terminal device TM1, the management server device 20, and the base station devices 30 can communicate with each other via a network NW. The network NW includes, for example, a cellular network, a Wi-Fi network, the Internet, a wide area network (WAN), a local area network (LAN), a public line, a dedicated line, and the like.

The information terminal device TM1 is implemented by, for example, a smart phone, a tablet computer (tablet PC), and the like that the user has. The information terminal device TM1 includes the information processing device 10. The information processing device 10 performs a process of providing the user with information on the base station devices 30. The management server device 20 is a server device that collects the information on the base station devices 30 via the network NW and manages the collected information. The base station device 30 is a device that provides a wireless communication network available by the information terminal device TM1 and other devices. Hereinafter, it is assumed that the base station device 30 is an access point that provides a Wi-Fi network. Hereinafter, it is assumed that a base station device 30-1 is a stationary access point provided in a store and the like, and a base station device 30-2 is an access point that is provided in a vehicle m and moves according to the travel of the vehicle m. In the following description, the base station device 30-1 and the base station device 30-2 are referred to as the base station devices 30 when they are not distinguished from each other.

Configuration of Management Server Device 20

Figures 2, 3:
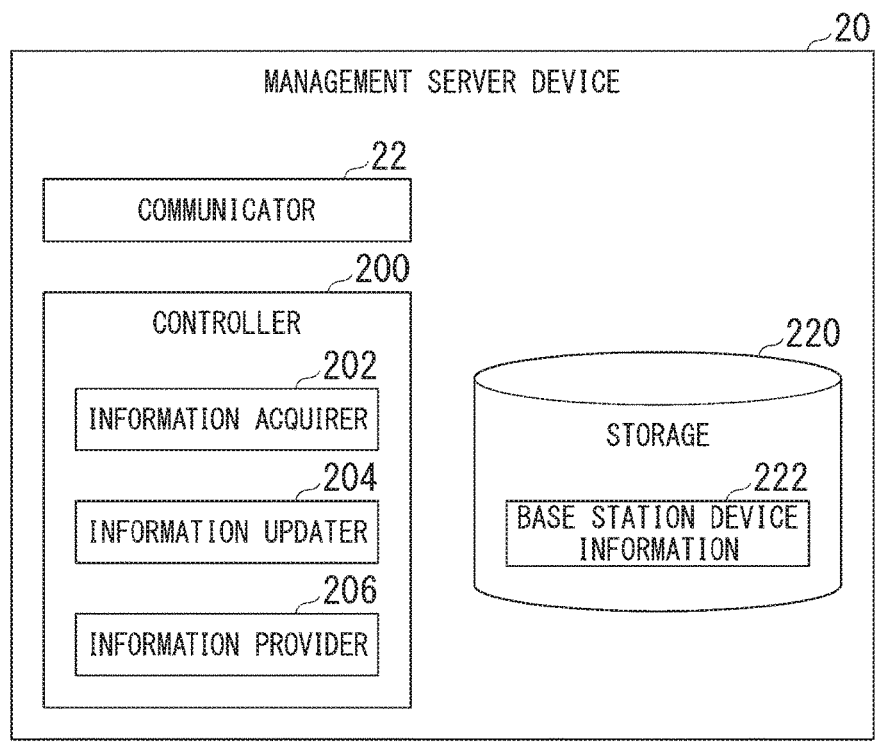
FIG. 2 is a diagram illustrating an example of a configuration of a management server device according to the first embodiment.
FIG. 3 is a diagram illustrating an example of the content of base station device information.

First, the management server device 20 will be described prior to the description of the information processing device 10. FIG. 2 is a diagram illustrating an example of the configuration of the management server device 20 according to the first embodiment. The management server device 20 includes, for example, a communicator 22, a controller 200, and a storage 220.

The communicator 22 is, for example, a network interface such as a network interface card (NIC). The communicator 22 communicates with the information terminal device TM1, the base station devices 30, and other devices via the network NW.

The controller 200 implements each functional unit such as an information acquirer 202, an information updater 204, and an information provider 206 by, for example, a processor such as a central processing unit (CPU) that executes a program (software) stored in the storage 220. Some or all of these components may be implemented by hardware (a circuit unit: including circuitry) such as a large scale integration (LSI), an application specific integrated circuit (ASIC), a field-programmable gate array (FPGA), and a graphics processing unit (GPU), or may be implemented by cooperation of software and hardware.

The storage 220 may be implemented by a storage device (storage device including a non-transitory storage medium) such as a hard disk drive (HDD) and a flash memory, may be implemented by a detachable storage medium (non-transitory storage medium) such as a DVD and a CD-ROM, or a storage medium mounted on a drive device. A part or the whole of the storage 220 may be an external device such as a NAS and an external storage server that the management server device 20 can access. The storage 220 stores, for example, information such as base station device information 222, in addition to the program. Details of the base station device information 222 will be described below.

The information acquirer 202 acquires the information on the base station devices 30 from the base station devices 30 via the network NW by the communicator 22, for example. The information on the base station devices 30 are, for example, information capable of identifying the base station devices 30 (hereinafter, base station device identification information), service set identifiers (SSIDs) of the Wi-Fi networks provided by the base station devices 30, base station device position information indicating the positions of the base station devices 30, communication quality information indicating the communication quality of the Wi-Fi networks provided by the base station devices 30, and radio wave intensity information indicating the radio wave intensity of the Wi-Fi networks provided by the base station devices 30. First, the information acquirer 202 instructs the base station devices 30 to provide these information by the communicator 22. The base station devices 30 transmit the base station device identification information, the SSID, the position information, the communication quality information, and the radio wave intensity information to the management server device 20 according to the instruction of the information acquirer 202. The information acquirer 202 acquires (receives) the base station device identification information, the SSID, the position information, the communication quality information, and the radio wave intensity information, which have been transmitted by the base station devices 30, by the communicator 22.

The information updater 204 generates (updates) the base station device information 222 based on the information on the base station devices 30 acquired by the information acquirer 202. FIG. 3 is a diagram illustrating an example of the content of the base station device information 222. The base station device information 222 is, for example, information including one or more records for each base station device 30 in which the base station device identification information, the SSID, the base station device position information, the communication quality information, and the radio wave intensity information are correlated to each other. In the following description, it is assumed that the communication quality of the Wi-Fi network provided by the base station device 30 is indicated by the number of devices connected to the Wi-Fi network. In such a case, when the number of devices connected to the Wi-Fi network is large, the communication quality of the base station device 30 is poor, and when the number of devices connected to the Wi-Fi network is small, the communication quality of the base station device 30 is good.

The communication quality of the Wi-Fi network provided by the base station device 30 may be indicated by an index based on a communication speed, a throughput, the presence or absence of congestion, and the like.

The information updater 204 searches for the base station device information 222 by using, as a search key, the base station device identification information acquired by the information acquirer 202, and when there already exist records with matching base station device identification information, the information updater 204 updates information on the already existing records to the acquired information. When there exist no records with the matching base station device identification information as a result of the search, the information updater 204 generates a record in which the acquired information are correlated with each other, and adds the record to the base station device information 222.

When the information on the base station devices 30 is requested from the information processing device 10, the information provider 206 provides the information processing device 10 with records corresponding to the requested base station devices 30 via the network NW by the communicator 22.

Configuration of Information Processing Device 10

Figure 4:
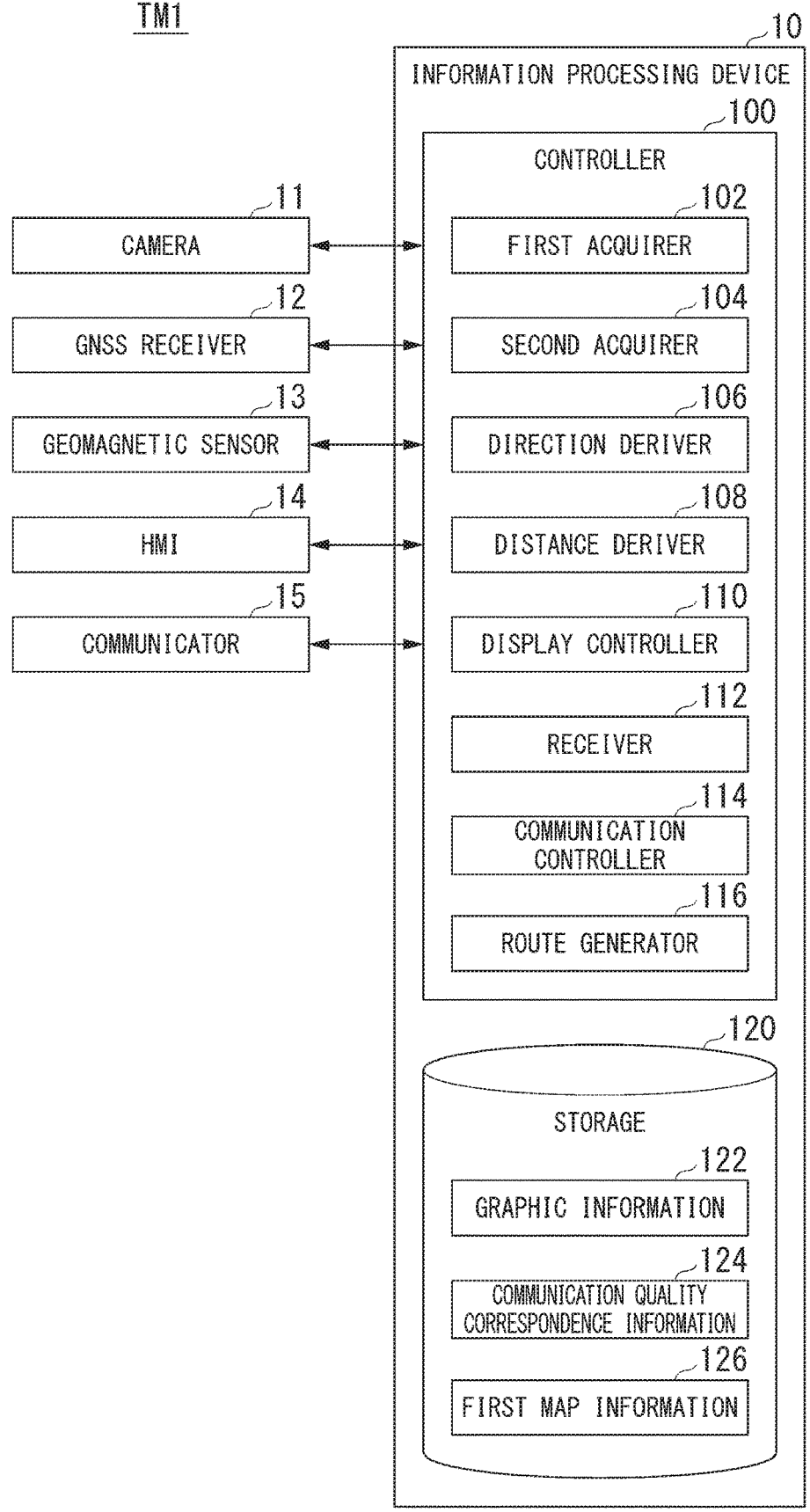
FIG. 4 is a diagram illustrating an example of a configuration of an information terminal device using the information processing device according to the first embodiment.

FIG. 4 is a diagram illustrating an example of a configuration of the information terminal device TM1 using the information processing device 10 according to the first embodiment. The information terminal device TM1 includes, for example, the information processing device 10, a camera 11, a global navigation satellite system (GNSS) receiver 12, a geomagnetic sensor 13, a human machine interface (HMI) 14, and a communicator 15. A display device (display) of the HMI 14 of the information terminal device TM1 is an example of a "viewing device".

The camera 11 is, for example, a digital camera using a solid-state imaging element such as a charge coupled device (CCD) and a complementary metal oxide semiconductor (CMOS). The information terminal device TM1 has, for example, a front surface and a back surface, and the camera 11 is provided on the back surface of the information terminal device TM1, for example. The camera 11 images, for example, the surroundings of the information terminal device TM1 based on an operation of the user and generates an imaged image.

The GNSS receiver 12 identifies the position of the information terminal device TM1 (that is, the information processing device 10) based on a signal received from a GNSS satellite. The geomagnetic sensor 13 detects the orientation (direction) of the information processing device 10. The HMI 14 includes a display device, a speaker, a touch panel, keys, and the like. In the following description, the position of the information terminal device TM1 is also referred to as the position of the information processing device 10.

The communicator 15 is, for example, a network interface such as a network interface card (NIC). The communicator 15 communicates with the management server device 20, the base station devices 30, and other devices via the Wi-Fi networks provided by the base station devices 30 or the network NW.

The information processing device 10 includes a controller 100 and a storage 120. The controller 100 implements each functional unit such as a first acquirer 102, a second acquirer 104, a direction deriver 106, a distance deriver 108, a display controller 110, a receiver 112, a communication controller 114, and a route generator 116 by, for example, one or more hard processors such as a CPU that executes a program (software) stored in the storage 120. Some or all of these components may be implemented by hardware (including a circuit unit) such as an LSI, an ASIC, an FPGA, and a GPU, or may be implemented by cooperation of software and hardware.

The storage 120 may be implemented by a storage device (storage device including non-transitory storage medium) such as a HDD and a flash memory, may be implemented by a detachable storage medium (non-transitory storage medium) such as a DVD and a CD-ROM, or a storage medium mounted on a drive device. A part or the whole of the storage 120 may be an external device such as a NAS and an external storage server that the information processing device 10 can access. The storage 120 stores, for example, information such as graphic information 122, communication quality correspondence information 124, and first map information 126, in addition to the program.

The first map information 126 is, for example, information on a road shape represented by links indicating a road and nodes connected to the links. The first map information 126 may include a road curvature, point of interest (POI) information, and the like. Details of the graphic information 122 and the communication quality correspondence information 124 will be described below.

The first acquirer 102 acquires, for example, information processing device position information indicating the position of the information processing device 10 identified by the GNSS receiver 12.

The second acquirer 104 acquires, for example, the information on the base station devices 30, to which the information processing device 10 is connectable, from the management server device 20 via the network NW by the communicator 15. The second acquirer 104 requests the management server device 20 for the information on the base station devices 30 existing in a predetermined range from the position of the information processing device 10 identified by the first acquirer 102 (hereinafter, a predetermined range). The management server device 20 acquires base station device position information from the second acquirer 104, and transmits records of the base station devices 30 existing in the predetermined range from a position indicated by the acquired information to the information processing device 10 by the communicator 22. The second acquirer 104 identifies the records of the base station devices 30 transmitted by the management server device 20, and acquires the record via the network NW by the communicator 15.

The direction deriver 106 acquires, for example, information indicating the direction (orientation) of the information processing device 10 detected by the geomagnetic sensor 13.

The distance deriver 108 derives a distance between each base station device 30 and the information processing device 10 for each base station device 30 based on, for example, the information processing device position information of the information processing device 10 acquired by the first acquirer 102 and the base station device position information of each base station device 30 indicated by the information acquired by the second acquirer 104.

The display controller 110 controls display of the display device of the HMI 14 based on, for example, any information of the information on the base station devices 30 acquired by the second acquirer 104, the direction of the information processing device 10 derived by the direction deriver 106, and the distance between the information processing device 10 and each base station device 30 derived by the distance deriver 108, the graphic information 122, and the communication quality correspondence information 124.

FIG. 5 is a diagram illustrating an example of the content of the graphic information 122. The graphic information 122 includes, for example, information indicating an image of a graphic used when the information on the base station device 30 is provided to the user. In FIG. 5, the graphic information 122 includes information indicating an image of a base station icon, which is a graphic indicating a base station device, an image of a radio wave intensity icon, which indicates the radio wave intensity of the Wi-Fi network provided by the base station device 30, and an image of a communication quality icon, which indicates the communication quality of the Wi-Fi network provided by the base station device 30.

The display controller 110 provides the user with the information on the base station device 30 in an easy-to-understand manner by superimposing the images of the icons included in the graphic information 122 on the imaged image generated by imaging the surroundings of the information processing device 10 by the camera 11.

FIG. 6 is a diagram illustrating an example of the content of the communication quality correspondence information 124. The communication quality correspondence information 124 is, for example, information indicating correspondence between the radio wave intensity of the base station device 30 and a display mode of the radio wave intensity icon and correspondence between the communication quality of the base station device 30 and a display mode of the communication quality icon. In FIG. 6, the communication quality correspondence information 124 indicates that the size of the radio wave intensity icon is "large" when the radio wave intensity of the base station device 30 is "strong", the size of the radio wave intensity icon is "medium" when the radio wave intensity of the base station device 30 is "medium", and the size of the radio wave intensity icon is "small" when the radio wave intensity of the base station device 30 is "weak". The communication quality correspondence information 124 indicates that the color of the communication quality icon is "dark" when the communication quality of the base station device 30 is "good", the color of the communication quality icon is "medium" when the communication quality of the base station device 30 is "medium", and the color of the communication quality icon is "light" when the communication quality of the base station device 30 is "poor".

The content of the communication quality correspondence information 124 is an example and is not limited thereto. In the communication quality correspondence information 124, for example, information for changing the display form by a method, other than a shape and a color, may be correlated with the radio wave intensity and the communication quality.

For example, when superimposing the images of the icons indicated by the graphic information 122 on the imaged image of the camera 11, the display controller 110 provides the user with the information on the base station devices 30 in an easy-to-understand manner by changing the display mode of the icons according to the radio wave intensity and the communication quality of the Wi-Fi networks provided by the base station devices 30.

Returning to FIG. 4, the receiver 112 receives, for example, an operation of the user that is input on the touch panel of the HMI 14. The operation of the user is, for example, an operation of selecting a base station device 30 to which the information terminal device TM1 is connected.

The communication controller 114 controls the communicator 15 to connect to the base station device 30 selected by the operation of the user received by the receiver 112, for example. Under the control of the communication controller 114, the communicator 15 performs communication via the Wi-Fi network provided by the base station device 30 selected by the user.

The route generator 116 generates a route to a position, where the communicator 15 is connectable to the Wi-Fi network of the base station device 30 related to the operation of the user received by the receiver 112, from the position of the information processing device 10 based on the position of the information processing device 10 acquired by the first acquirer 102, the position of the base station device 30 indicated by the record acquired by the second acquirer 104, and the first map information 126.

Presentation of Image Indicating Presence of Base Station Device

Figure 7:
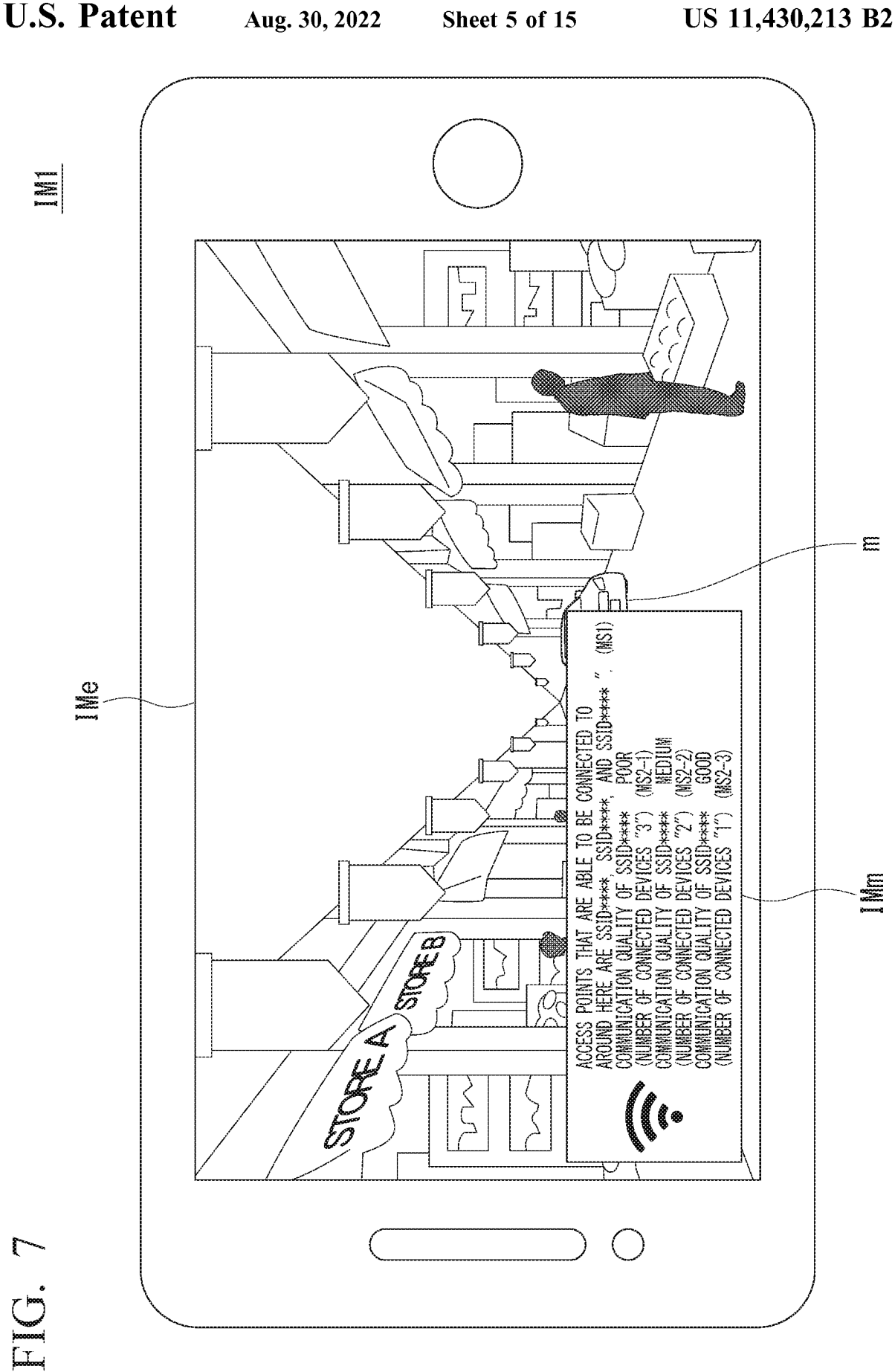
FIG. 7 is a diagram illustrating an example of an image indicating the presence of a base station device.

FIG. 7 is a diagram illustrating an example of an image IM1 indicating the presence of the base station devices 30. The display controller 110 generates, for example, the image IM1 obtained by superimposing a message image IMm, which indicates the presence of the base station devices 30, on a surrounding image IMe generated by the camera 11, and allows the display device of the HMI 14 to display the image IM1. The display controller 110 generates the message image IMm based on the records of the base station devices 30 acquired by the second acquirer 104. Hereinafter, it is assumed that the records acquired by the second acquirer 104 are a record related to the Wi-Fi network provided by the base station device 30 installed in a store A, a record related to the Wi-Fi network provided by the base station device 30 installed in a store B, and a record related to the Wi-Fi network provided by the base station device 30 provided in a vehicle m.

The message image IMm includes, for example, the SSIDs of the Wi-Fi networks provided by the base station devices 30 existing in the predetermined range from the information processing device 10, a message MS1 indicating the installation positions of the base station devices 30, and messages MS2 (illustrated messages MS2-1 to MS2-3) indicating the communication quality of the Wi-Fi networks provided by the base station devices 30. The message MS1 is, for example, "Access points that are able to be connected to around here are SSID** (store A), SSID (store B), and SSID (vehicle m)". The message MS2-1 related to the base station device 30 of the store A is, for example, "communication quality of SSID: poor (number of connected devices "3")", the message MS2-2 related to the base station device 30 of the store B is, for example, "communication quality of SSID: medium (number of connected devices "2")", the message MS2-3 related to the base station device 30 of the vehicle m is, for example, "communication quality of SSID**: good (number of connected devices "1")", and the like. The message image IMm is an example of an image indicating the communication quality of the Wi-Fi networks provided by the base station devices 30.

Based on the direction (orientation) of the user derived by the direction deriver 106, the display controller 110 may generate a message image IMm including the information on the base station device 30 existing in the direction in which the user is facing among the base station devices 30 existing in the predetermined range from the information processing device 10. The message image IMm may include the message MS1 or the message MS2.

By presenting the image IM1 to the user, the information processing device 10 allows the user to visually recognize an image (in this example, the message image IMm) that is superimposed on a real space and indicates the presence of the base station devices 30, so that it is possible to provide the user with the information on the base station devices 30 in an easy-to-understand manner.

Figure 8:
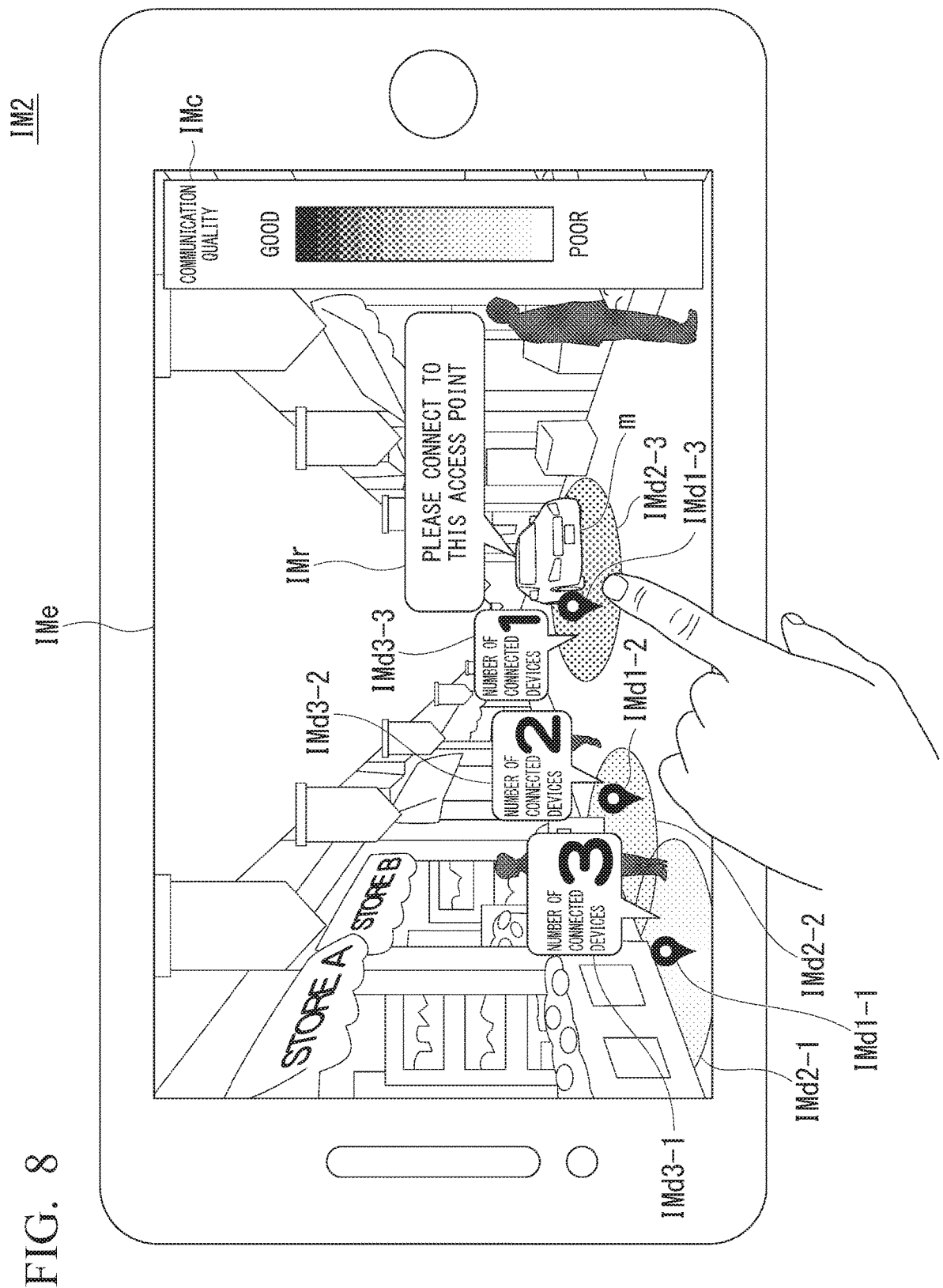
FIG. 8 is a diagram illustrating an example of an image indicating the communication quality of communication provided by a base station device.

Presentation of Image Indicating Communication Quality of Communication Provided by Base Station Device FIG. 8 is a diagram illustrating an example of the message MS2 indicating the communication quality of communication provided by the base station devices 30. The display controller 110, for example, superimposes graphic images IMd1 (illustrated graphic images IMd1-1 to IMd1-3), which are base station icons, graphic images IMd3 (illustrated graphic images IMd3-1 to IMd3-3), which are communication quality icons, and graphic images IMd2 (illustrated graphic images IMd2-1 to IMd2-3), which are radio wave intensity icons, among the graphic images included in the graphic information 122, on the surrounding image IMe generated by the camera 11, generates an image IM2 including a communication quality image IMc indicating the correspondence between the color of the communication quality icon and the communication quality, and allows the display device of the HMI 14 to display the image IM2.

Based on the position of the information processing device 10 acquired by the first acquirer 102, the positions of the base station devices 30 acquired by the second acquirer 104, and the direction of the user derived by the direction deriver 106, the display controller 110 generates, for example, the image IM2 by superimposing the graphic images IMd1-1 to IMd1-3 on positions on the surrounding image IMe corresponding to the positions of the base station devices 30 in the real space illustrated as the surrounding image IMe. The graphic images IMd1 are, for example, reverse teardrop-shaped images indicating positions.

Based on the records acquired by the second acquirer 104 and the communication quality correspondence information 124, the display controller 110 determines the display mode of the graphic images IMd2, which are the radio wave intensity icons, among the graphic images included in the graphic information 122. The display controller 110 superimposes the graphic images IMd2-1 to IMd2-3 of the determined display mode on the positions on the surrounding image IMe corresponding to the positions of the base station devices 30 in the real space illustrated by the surrounding image IMe, thereby generating the image IM2. The graphic images IMd2 are, for example, circular images centered on the positions of the base station devices 30.

The camera 11 may be a stereo camera. In such a case, based on objects existing in the real space in a range imaged by the camera 11 and the feature points of the ground surface, the display controller 110 may process and dispose the graphic images IMd2-1 to IMd2-3 such that the objects are not shielded and circles are disposed on the ground surface, and superimpose the graphic images IMd2-1 to IMd2-3 on the surrounding image IMe. In this way, the information processing device 10 can present the graphic images IMd2 to the user as augmented reality (AR) images.

Based on the records of the base station devices 30 acquired by the second acquirer 104, the display controller 110 determines the display mode of the graphic images IMd3, which are the communication quality icons, among the graphic images included in the graphic information 122. The display controller 110 superimposes the graphic images IMd3-1 to IMd3-3 of the determined display mode on the positions of the base station devices 30 or the positions of the range indicated by the graphic images IMd2 in the real space illustrated by the surrounding image IMe, thereby generating the image IM2. The graphic image IMd3 is, for example, a balloon image indicating the communication quality of the base station device 30 (in this example, the number of devices connected to the Wi-Fi network provided by the base station device 30). The graphic images IMd1 to IMd3 are examples of images indicating communication quality.

Regarding Another Display Mode of Graphic Images IMd1 to IMd3

The display controller 110 may change the display mode of the graphic images IMd1 to IMd3 based on the distance from the information processing device 10 to each base station device 30 derived by the distance deriver 108. For example, the display controller 110 allows the graphic images IMd1 to IMd3 related to each base station device 30 to be displayed in a small size as the distance from the information processing device 10 to each base station device 30 derived by the distance deriver 108 becomes longer, and allows the graphic images IMd1 to IMd3 related to each base station device 30 to be displayed in a large size as the distance from the information processing device 10 to each base station device 30 derived by the distance deriver 108 becomes shorter. In this way, the information processing device 10 can intuitively present the distance to each base station device 30 to the user.

Even though the radio wave intensity of the base station device 30 is strong and it is determined to display the graphic images IMd2, which are the radio wave intensity icons, in a large size, when the base station device 30 is far from the information processing device 10, the display controller 110 allows the graphic images IMd2 to be displayed in a small size. For example, even though the radio wave intensity of the Wi-Fi network provided by the base station device 30 is strong, when the base station device 30 is far from the information processing device 10, the radio wave intensity of the Wi-Fi network provided by the base station device 30 becomes weak in the information processing device 10. Consequently, the information processing device 10 can intuitively present, to the user, the radio wave intensity of the base station device 30 corresponding to the position of the information processing device 10 by determining the display mode as described above.

Selection of Base Station Device 30 Using Image IM2

In the state in which the image IM2 is displayed on the display device of the HMI 14 under the control of the display controller 110, the receiver 112 receives an operation of the user that is input on the touch panel of the HMI 14. The operation of the user is, for example, an operation of selecting one of the graphic images IMd1 to IMd3 related to a base station device 30, whose Wi-Fi network is to be used, among a plurality of base station devices 30 in the state in which the image IM2 is displayed on the display device of the HMI 14. In FIG. 8, the user selects the graphic image IMd2-3 and requests to connect to the Wi-Fi network provided by the base station device 30 provided in the vehicle m.

Based on the operation of the user received by the receiver 112, the communication controller 114 controls the communicator 15 to connect to the Wi-Fi network of the base station device 30 corresponding to the selected one of the graphic images IMd1 to IMd3. In FIG. 8, the user has selected the graphic image IMd2-3 related to the base station device 30 provided in the vehicle m, the communication controller 114 controls the communicator 15 to connect to the Wi-Fi network provided by the base station device 30 provided in the vehicle m. For example, based on the record acquired by the second acquirer 104, the communication controller 114 selects the SSID of the Wi-Fi network provided by the base station device 30 provided in the vehicle m from the SSIDs of Wi-Fi networks to which the communicator 15 is connectable, and allows the communicator 15 to connect to the Wi-Fi network. In this way, the information processing device 10 can allow the user to easily use communication via the base station device 30 selected by the user.

When password authentication is used for the Wi-Fi networks provided by the base station devices 30, the passwords of the Wi-Fi networks may be further correlated with the records of the base station device information 222. The communication controller 114 controls the communicator 15 to connect to the Wi-Fi networks by using the passwords of the Wi-Fi networks included in the records acquired by the second acquirer 104. The display controller 110 may superimpose an image (illustrated request image IMr), which indicates the base station device 30 selected by the receiver 112, on the surrounding image IMe. In this way, the information processing device 10 can inform the user whether a desired base station device 30 has been correctly selected.

Figure 9:
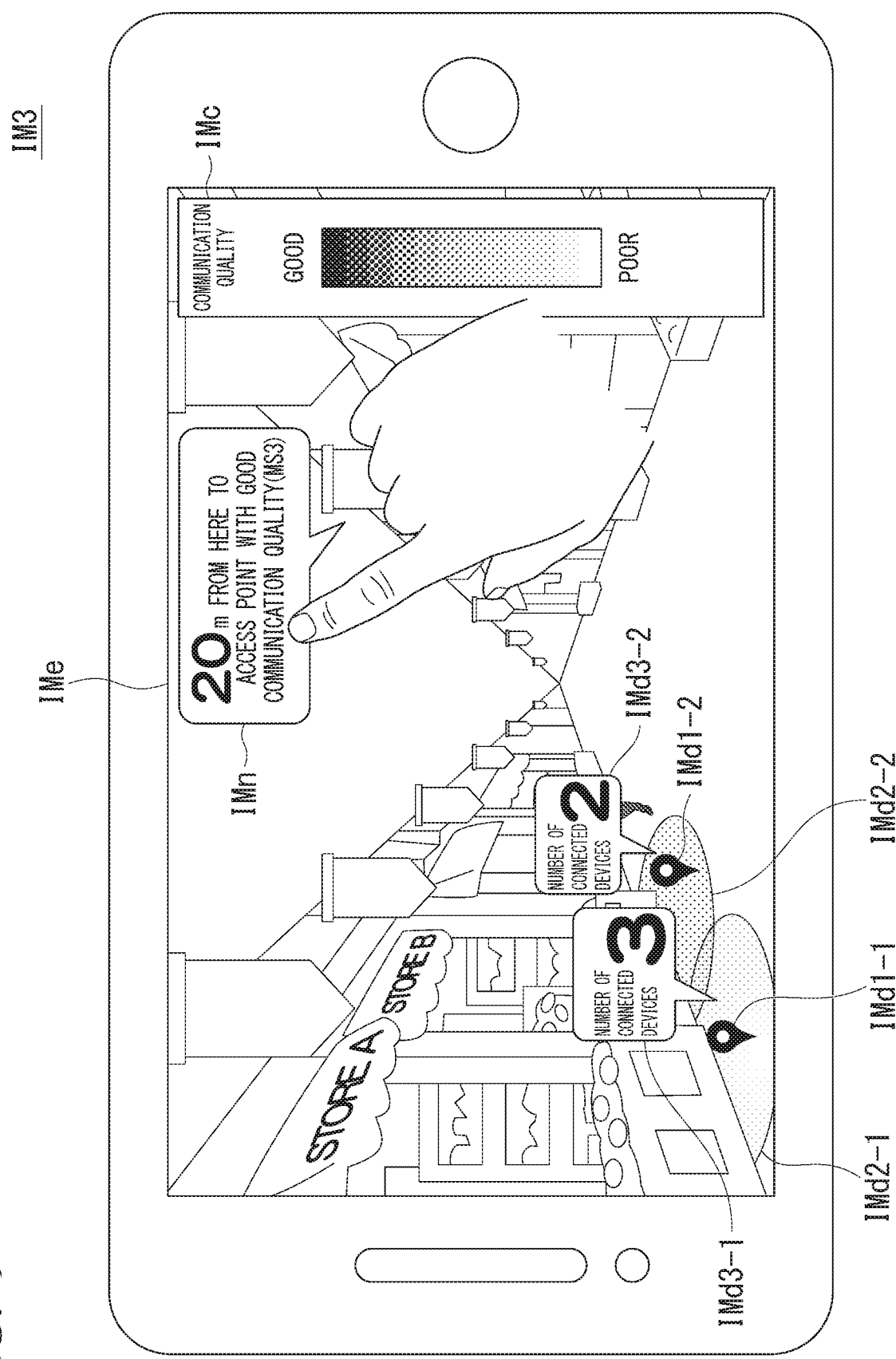
FIG. 9 is a diagram illustrating an example of an image indicating the communication quality of communication provided by a base station device.

Presentation of Image Indicating Communication Quality of Communication Provided by Base Station Device FIG. 9 is a diagram illustrating an example of an image IM3 indicating the communication quality of communication provided by the base station devices 30. Even though the second acquirer 104 acquires the records of the base station devices 30 existing in the predetermined range from the information processing device 10, the base station devices 30 related to the records may not be included in a range of the real space indicated by the surrounding image IMe. In such a case, for example, based on the base station device position information included in the records of the base station devices 30 acquired by the second acquirer 104, the display controller 110 generates the image IM3 in which an image (illustrated guide image IMn) indicating the presence of the base station devices 30 is superimposed on the surrounding image IMe, and allows the display device of the HMI 14 to display the image IM3. Hereinafter, it is assumed that the guide image IMn is an image related to the base station device 30 provided in the vehicle m.

For example, based on the position of the information processing device 10 acquired by the first acquirer 102, the positions of the base station devices 30 acquired by the second acquirer 104, and the direction of the user derived by the direction deriver 106, the display controller 110 superimposes the guide image IMn on a position on the surrounding image IMe corresponding to the direction of the base station device 30 in the real space indicated as the surrounding image IMe, thereby generating the image IM3. The guide image IMn includes, for example, a message MS3 indicating the distance between the information processing device 10 and each base station device 30 derived by the distance deriver 108 and the communication quality of the base station device 30 existing at a position this distance away from the information processing device 10. The message MS3 is, for example, "20 m from here to access point with good communication quality" and the like.

The display controller 110 may put the graphic images IMd3-1 to IMd3-3 related to the base station devices 30 provided in the range of the real space indicated by the surrounding image IMe into the image IM3, or may perform a process of generating the image IM3 including the guide image IMn when the second acquirer 104 acquires the record of a base station device 30 with better communication quality than the base station devices 30 provided in the range of the real space indicated by the surrounding image IMe.

Selection of Base Station Device 30 Using Image IM3

In the state in which the image IM3 is displayed on the display device of the HMI 14 under the control of the display controller 110, the receiver 112 receives an operation of the user that is input on the touch panel of the HMI 14. The operation of the user is, for example, an operation of selecting one of the graphic images IMd1 to IMd3 related to a base station device 30, whose Wi-Fi network is to be used among a plurality of base station devices 30, and the guide image IMn in the state in which the image IM3 is displayed on the display device of the HMI 14. In FIG. 9, the user selects the guide image IMn and requests to connect to the Wi-Fi network provided by the base station device 30 provided in the vehicle m.

Figure 10:
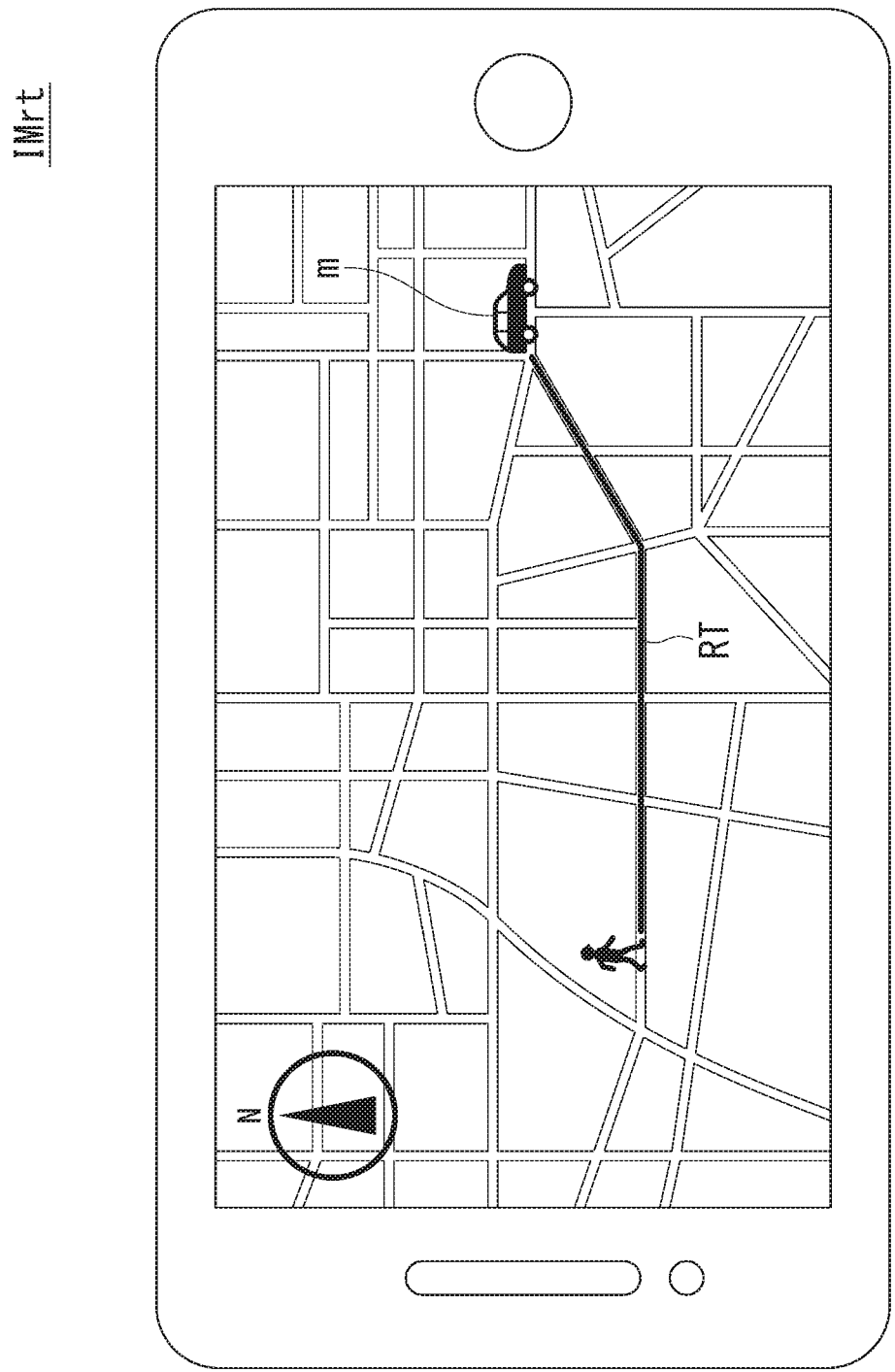
FIG. 10 is a diagram illustrating an example of a route image to a base station device corresponding to a selected guide image.

FIG. 10 is a diagram illustrating an example of a route image IMrt for the base station device 30 corresponding to the selected guide image IMn. When the guide image IMn is selected by the receiver 112, the route generator 116 generates a movement route RT from the position of the information processing device 10 acquired by the first acquirer 102 to the position of the base station device 30 corresponding to the guide image IMn, based on the first map information 126. Based on the first map information 126 and the movement route RT generated by the route generator 116, the display controller 110 generates the route image IMrt, in which an image indicating the movement route RT is superimposed on a map image, and allows the display device of the HMI 14 to display the route image IMrt.

When it is determined that the position of the information processing device 10 acquired by the first acquirer 102 is a position where the information processing device 10 is connectable to the Wi-Fi network of the base station device 30 corresponding to the guide image IMn selected based on the operation of the user received by the receiver 112, the communication controller 114 controls the communicator 15 to connect to the Wi-Fi network. Since the subsequent processing is the same as when the graphic images IMd1-1 to IMd1-3 are selected, a description thereof will be omitted. In this way, the information processing device 10 can guide the user to the base station device 30 that the user desires to use.

When the information processing device 10 has a navigation application function, a process may be performed to present the movement route RT to the base station device 30 to the user by outputting the position of the base station device 30 corresponding to the guide image IMn to the function.

The display controller 110 may superimpose the graphic images IMd1 to IMd3 on the surrounding image IMe with respect to a base station device 30 to which the communicator 15 is connectable by the communication controller 114 and superimpose the guide image IMn on the surrounding image IMe with respect to a base station device 30 to which the communicator 15 is not connectable by the communication controller 114, at the current position of the information processing device 10, thereby generating the image IM3. In this way, when the user desires to use the Wi-Fi network provided by a base station device 30 with which communication is not possible, the information processing device 10 can positively guide the user to a position where the Wi-Fi network is available.

Operation Flow

Figure 11:
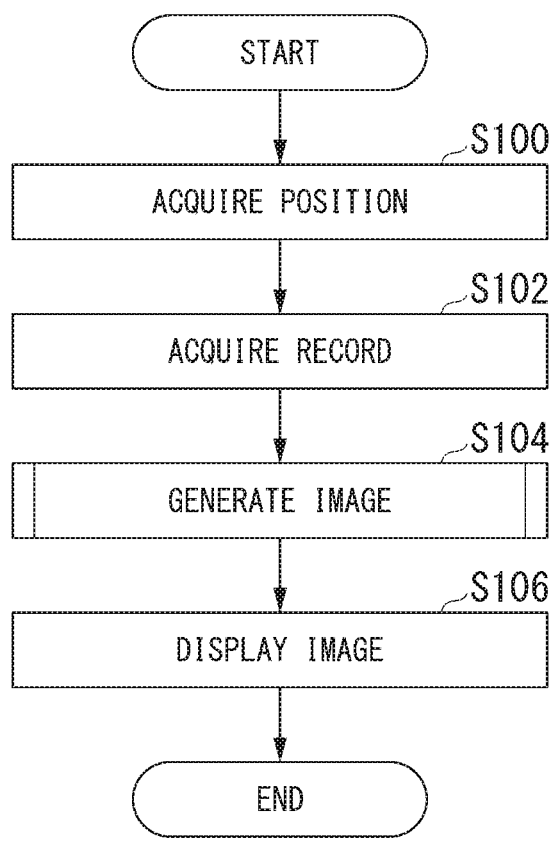
FIG. 11 is a flowchart illustrating the flow of a series of operations of the information processing device according to the first embodiment.

FIG. 11 is a flowchart illustrating the flow of a series of operations of the information processing device 10 according to the first embodiment. First, the first acquirer 102 acquires the position of the information processing device 10 (step S100). Next, the second acquirer 104 acquires records related to the base station devices 30 existing in the predetermined range from the information processing device 10 (step S102). The display controller 110 generates one of the images IM1 to IM3 based on the information acquired by the first acquirer 102 and the second acquirer 104 (step S104). When generating the image IM1, the display controller 110 superimposes the message image IMm, which includes the SSIDs of the Wi-Fi networks provided by the base station devices 30, the message MS1 indicating the installation positions of the base station devices 30, and the message MS2 indicating the communication quality of the Wi-Fi networks provided by the base station devices 30, on the surrounding image IMe based on the records acquired by the second acquirer 104, thereby generating the image IM1. Details of step S104 when generating the images IM2 and IM3 will be described below. The display controller 110 allows the display device of the HMI 14 to display one of the generated images IM1 to IM3 (step S106).

Figure 12:
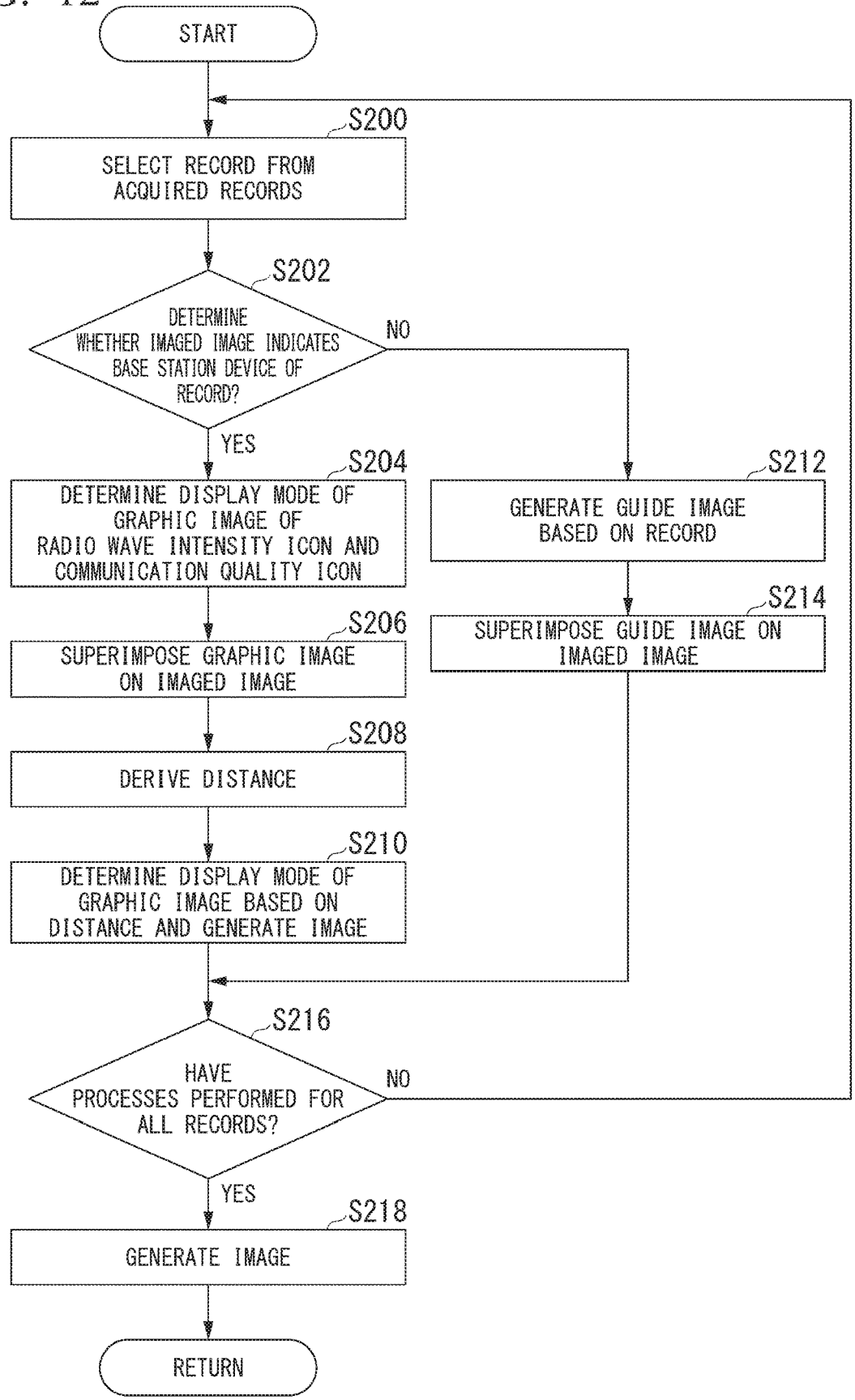
FIG. 12 is a flowchart illustrating the flow of a series of processes of step S104 when a display controller generates an image.

FIG. 12 is a flowchart illustrating the flow of a series of processes of step S104 when the display controller 110 generates the image IM2 or the image IM3. First, the display controller 110 selects a record to be processed from the records acquired by the second acquirer 104 (step S200). Next, the display controller 110 determines whether the surrounding image IMe indicates the base station devices 30 related to the records acquired by the second acquirer 104 (step S202). When the surrounding image IMe indicates the base station devices 30, the display controller 110 determines the display mode of the graphic images IMd2, which are the radio wave intensity icons of the base station devices 30, and the graphic images IMd3, which are the communication quality icons of the base station devices 30, based on the records acquired by the second acquirer 104 and the communication quality correspondence information 124 (step S204). Next, the display controller 110 superimposes the graphic images IMd1 to IMd3, whose display mode has been determined, on positions on the surrounding image IMe corresponding to the positions of the base station devices 30 in the real space indicated as the surrounding image IMe (step S206).

Next, the distance deriver 108 derives a distance between the information processing device 10 and each base station device 30 based on the position of the information processing device 10 acquired by the first acquirer 102 and the base station device position information included in the records acquired by the second acquirer 104 (step S208). Next, the display controller 110 determines the display mode of the graphic images IMd2, which are the radio wave intensity icons of the base station devices 30, and the graphic images IMd3, which are the communication quality icons of the base station devices 30, based on the distance between the information processing device 10 and each base station device 30 derived by the distance deriver 108 (step S210).

When the surrounding image IMe does not indicate the base station devices 30, the display controller 110 generates the guide image IMn based on the records acquired by the second acquirer 104 (step S212). Based on the position of the information processing device 10 acquired by the first acquirer 102, the positions of the base station devices 30 acquired by the second acquirer 104, and the direction of the user derived by the direction deriver 106, the display controller 110 superimposes the guide image IMn on positions on the surrounding image IMe corresponding to the direction of the base station devices 30 in the real space indicated as the surrounding image IMe, thereby generating the image IM3 (step S214).

The display controller 110 repeats the processes of steps S200, S202, S204, S206, S208, S210, and S212 during a period in which the processes of steps S202, S204, S206, S208, S210, S212, and S214 are performed for all the records acquired by the second acquirer 104 (step S216). The display controller 110 generates the image IM2 including the graphic images IMd1 and the graphic images IMd2 and IMd3, whose display mode has been determined, or the image IM3 including the graphic images IMd1 to IMd3 and the guide image IMn (step S218).

In the above, although the case where a series of processes of steps S202, S204, S206, S208, S210, S212, and S214 are performed according to the flowchart has been described, the present invention is not limited thereto. In the flowchart, any one of the processes of steps S204 and S206, the processes of steps S208 and S210, the processes of step S202, S212, and S214 may be performed.

Figure 13:
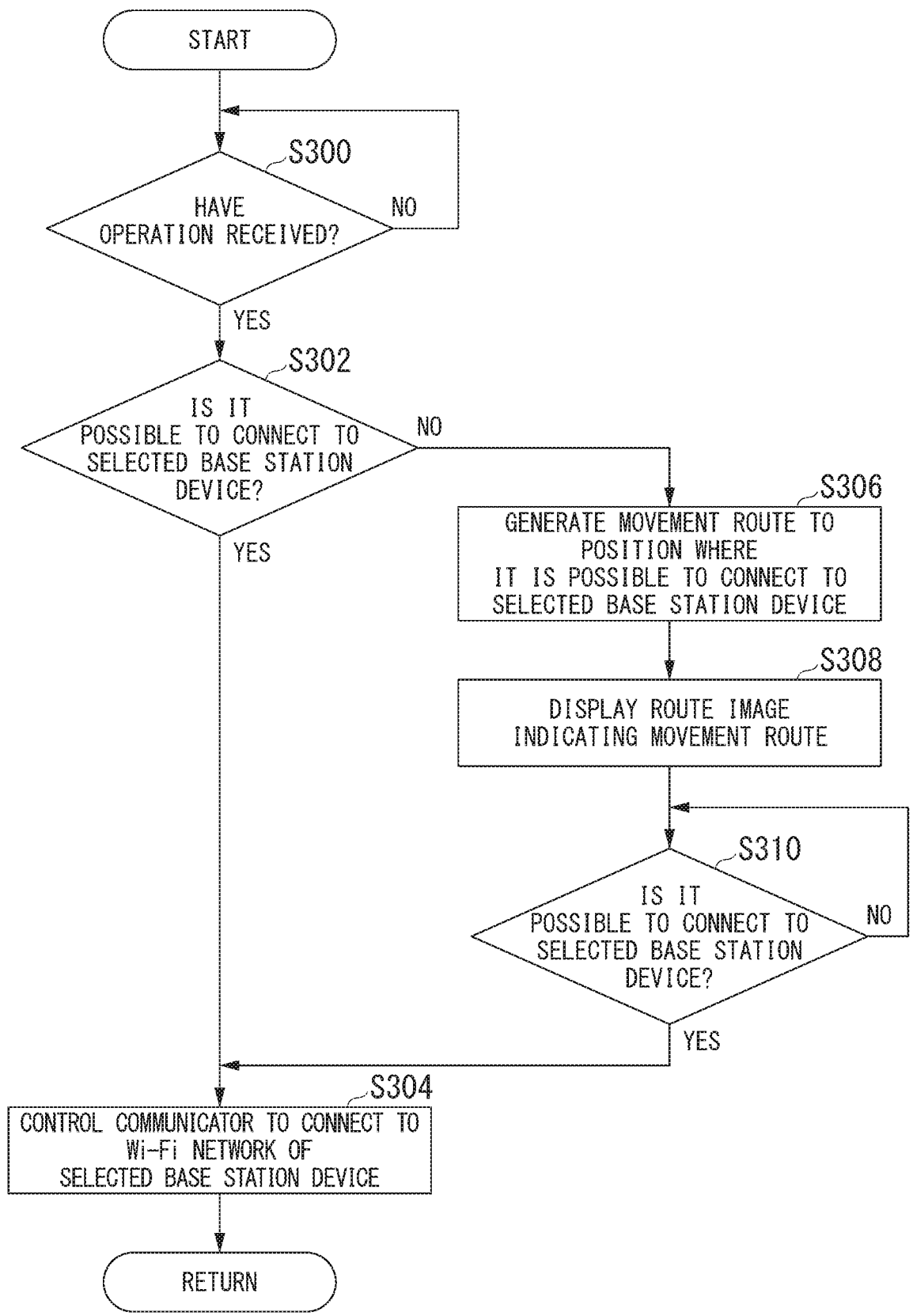
FIG. 13 is a flowchart illustrating the flow of a series of processes of connecting to a based station device based on an operation of a user.

FIG. 13 is a flowchart illustrating the flow of a series of processes of connecting to the base station device 30 based on the operation of the user. First, the receiver 112 determines whether the operation of the user input on the touch panel of the HMI 14 is being received in the state in which the image IM2 or the image IM3 is displayed on the display device of the HMI 14 under the control of the display controller 110 (step S300). The receiver 112 waits during a period in which the operation of the user is being received on the touch panel of the HMI 14. When the operation of the user is received by the receiver 112, the communication controller 114 determines whether it is possible to connect the communicator 15 to the base station device 30 related to the graphic image IMd selected by the user (step S302). When it is determined that it is possible to connect the communicator 15 to the base station device 30 related to the graphic image IMd selected by the user, the communication controller 114 controls the communicator 15 to connect to the Wi-Fi network provided by the base station device 30 (step S304).

When it is determined by the communication controller 114 that it is not possible to connect the communicator 15 to the base station device 30 related to the graphic image IMd selected by the user, the route generator 116 generates the movement route RT to the base station device 30 (step S306). Based on the first map information 126 and the movement route RT generated by the route generator 116, the display controller 110 superimposes an image indicating the movement route RT on the map image to generate the route image IMrt, and allows the display device of the HMI 14 to display the route image IMrt (step S308). The communication controller 114 determines whether a position is one where it is possible to connect the communicator 15 to the base station device 30 related to the graphic image IMd selected by the user (that is, whether the user has moved to the base station device 30, based on the image indicating the movement route RT) (step S310). When it is determined that it is possible to connect the communicator 15 to the base station device 30 related to the graphic image IMd selected by the user, the communication controller 114 controls the communicator 15 to connect to the Wi-Fi network provided by the base station device 30 (step S304).

Summary of First Embodiment

As described above, the information processing device 10 of the present embodiment can provide the user with the information on the base station devices 30 by displaying any one of the images IM1 to IM3 on the display device of the HMI 14. According to the information processing device 10 of the present embodiment, the display mode of the graphic images IMd is changed based on the communication quality, the radio wave intensity, or the distance between the information processing device 10 and each base station device 30, so that it is possible to provide the user with information on communication (in this example, Wi-Fi communication) via the base station device 30 in an easy-to-understand manner. According to the information processing device 10 of the present embodiment, the user is allowed to select the graphic images IMd1 to IMd3 included in the image IM2 or the image IM3 and the communicator 15 is controlled to communicate with the selected base station device 30, so that the user can easily use the communication via the base station device 30.

Second Embodiment

Hereinafter, the second embodiment of the present invention will be described with reference to the drawings. In the first embodiment, the case where the information processing device 10 is implemented as one function of the information terminal device TM1 has been described; however, in the second embodiment, a case where an information processing device 10a is implemented as one function of a vehicle system TM2 mounted on a host vehicle M will be described. In the following description, the same components as those in the first embodiment are denoted by the same reference numerals and a description thereof will be omitted.

Figure 14:
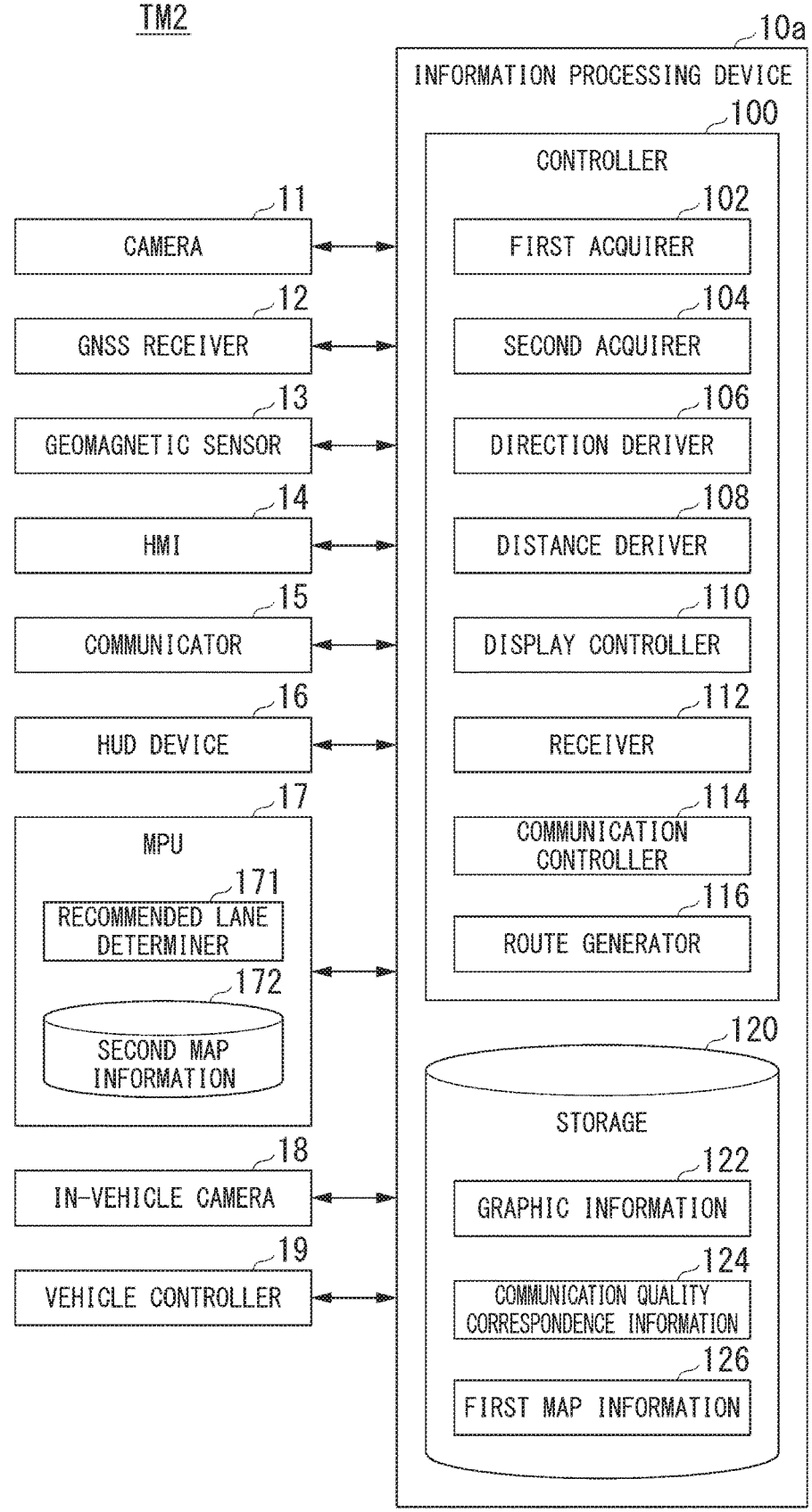
FIG. 14 is a diagram illustrating an example of a configuration of a vehicle system using an information processing device of a second embodiment.

FIG. 14 is a diagram illustrating an example of a configuration of the vehicle system TM2 using the information processing device 10a of the second embodiment. The vehicle system TM2 includes, for example, the information processing device 10a, the camera 11, the GNSS receiver 12, the geomagnetic sensor 13, the HMI 14, the communicator 15, a head-up display (hereinafter, HUD device) 16, a map positioning unit (MPU) 17, an in-vehicle camera 18, and a vehicle controller 19.

The HUD device 16 projects light including an image to a combiner provided on a front side of a front windshield when viewed from a driver, thereby allowing a viewer (in this case, a user) to visually recognize a virtual image. For example, when the host vehicle M is moving by manual driving or when the driver performs automatic driving while the driver is in the host vehicle M, the HUD device 16 superimposes an image related to information for supporting the driver's driving on the landscape in front of the host vehicle M and allows the driver to visually recognize the superimposed image. The information for supporting the driver's driving includes, for example, information such as the speed of the host vehicle M, a driving force distribution ratio, an engine speed, an operation state shift position of a driving support function, a sign recognition result, and an intersection position. The driving support function includes, for example, adaptive cruise control (ACC), lane keep assist (LKAS), collision mitigation brake system (CMBS), a traffic jam assist function, and the like. By using the HUD device, the driver can ascertain various types of displayed information while maintaining the direction of the line of sight at the time of driving to the front. The HUD device 16 of the present embodiment allows the user to visually recognize a virtual image related to the communication quality of the Wi-Fi networks provided by the base station devices 30, based on the control of the information processing device 10a. The HUD device 16 is an example of a "viewing device".

The vehicle system TM2 may be implemented by a head-up display or a transparent liquid crystal display provided in a side window or a rear window (and the vicinity thereof) as well as the front windshield, or may be implemented by a head-up display or a transparent liquid crystal display used as a navigation, a meter and the like, instead of the HUD device 16. When the host vehicle M has two or three wheels, the HUD device 16 or the transparent liquid crystal display may be provided on a cowl instead of the front windshield, or the transparent liquid crystal display may be provided on the shield of a helmet.

The MPU 17 includes, for example, a recommended lane determiner 171, and holds second map information 172 in a storage device such as an HDD and a flash memory. The recommended lane determiner 171 divides the movement route RT provided from the route generator 116 into a plurality of blocks (for example, every 100 m in the vehicle travel direction), and determines a recommended lane for each block with reference to the second map information 172. The recommended lane determiner 171 determines on which lane numbered from the left to travel. When there is a branch point on the route on the map, the recommended lane determiner 171 determines a recommended lane such that the host vehicle M can travel on a reasonable route for traveling to a branch destination.

The second map information 172 is more accurate map information than the first map information 126. The second map information 172 includes, for example, information on the center of a lane, information on the boundary of the lane, and the like. The second map information 172 may include road information, traffic regulation information, address information (address and postal code), facility information, telephone number information, and the like. The second map information 172 may be updated at any time by the communicator 15 communicating with another device.

The in-vehicle camera 18 is, for example, a digital camera using a solid-state imaging element such as a CCD and a CMOS. The in-vehicle camera 18 is provided, for example, in the interior of the host vehicle M, images the interior of the host vehicle M, and generates an imaged image.

The vehicle controller 19 acquires information on the position of an object in the vicinity of the host vehicle M and information on states such as a speed and an acceleration, based on recognition results of the camera 11 and recognition function units (for example, a radar device, a finder and the like) (not illustrated) provided in the vehicle system TM2. The vehicle controller 19 recognizes a lane (a travel lane), on which the host vehicle M is traveling, a temporary stop line, an obstacle, a red light, a tollgate, other road events, and the like based on the recognition results of the camera 11 and the recognition function unit. Then, the vehicle controller 19 generates a target trajectory along which the host vehicle M will travel in the future automatically (independent of a driver's operation) so as to be able to travel on the recommended lane determined by the recommended lane determiner 171 in principle and further to cope with surrounding situations of the host vehicle M. The target trajectory includes a speed element, for example. For example, the target trajectory is represented as a sequence of points (trajectory points) to be reached by the host vehicle M. The trajectory point is a point that the host vehicle M is to reach every predetermined travel distance (for example, about several meters) as a road distance, and a target speed and a target acceleration at every predetermined sampling time (for example, about several tenths of a [sec]) are separately generated as a part of the target trajectory. The trajectory point may be a position that the host vehicle M is to reach at the sampling time at every predetermined sampling time. In such a case, information on the target speed and the target acceleration is represented by an interval between the trajectory points. The vehicle controller 19 controls a travel driving force output device, a brake device, and a steering device provided in the host vehicle M such that the host vehicle M passes along the generated target trajectory at scheduled times.

Figure 15:
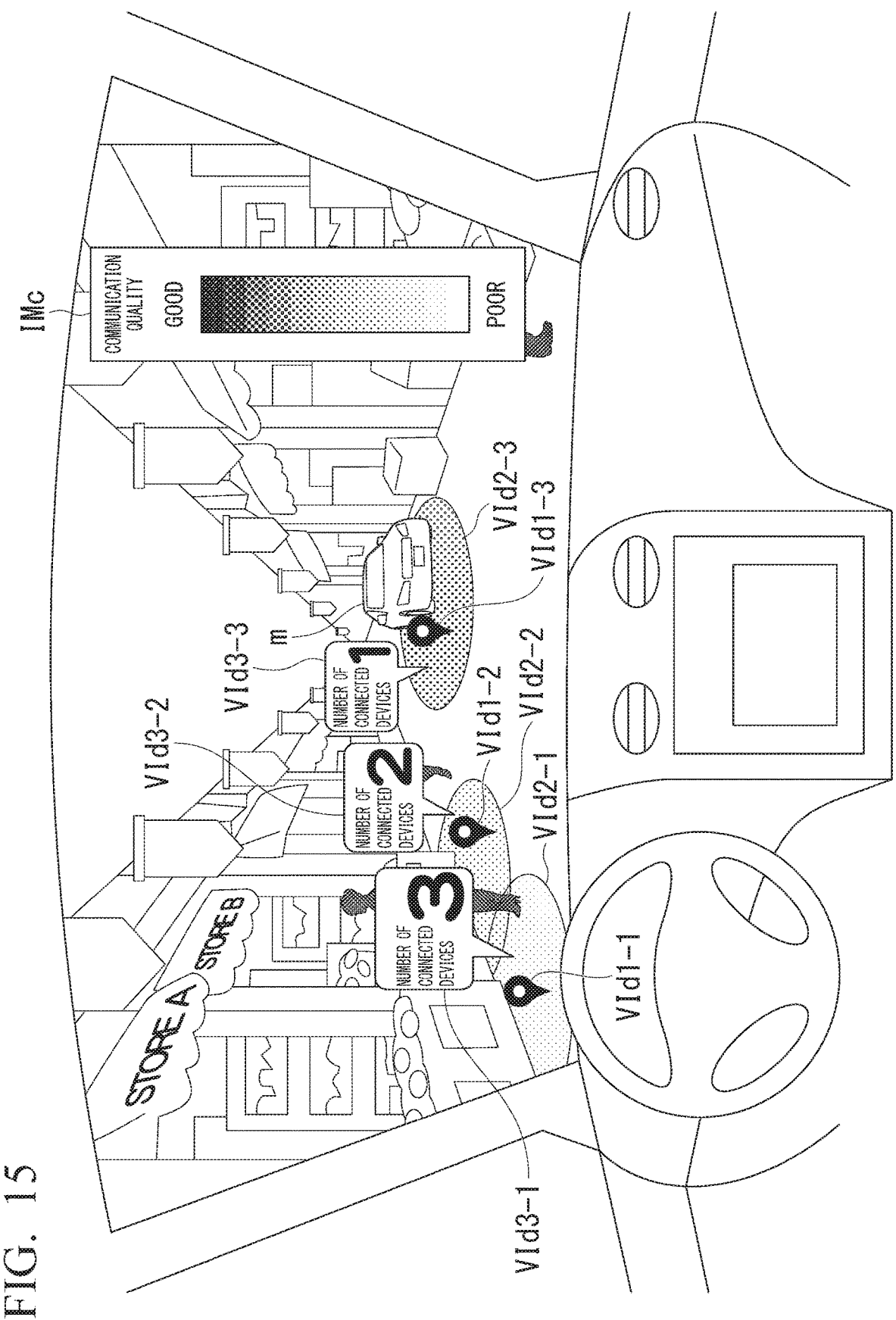
FIG. 15 is a diagram illustrating an example of an image indicating the communication quality of communication provided by a base station device.

FIG. 15 is a diagram illustrating an example of an image VId indicating the communication quality of communication provided by the base station device 30. The display controller 110 of the present embodiment allows the HUD device 16 to project any one of images VId1 to VId3 corresponding to the aforementioned graphic images IMd1 to IMd3, an image (not illustrated) corresponding to the aforementioned guide image IMn, and an image (not illustrated) corresponding to the aforementioned message image IMm, thereby allowing the user to visually recognize the image. Since a process of determining the display mode of the image VId2 based on radio wave intensity is the same as the process of determining the display mode of the image IMd2 based on the radio wave intensity described above, a description thereof will be omitted. Since a process of determining the display mode of the image VId3 based on communication quality is the same as the process of determining the display mode of the image IMd3 based on the communication quality described above, a description thereof will be omitted.

The display controller 110 controls the HUD device 16 based on the surrounding image IMe imaged by the camera 11, and allows various images to be displayed at positions corresponding to the positions of the base station devices 30 in the real space (that is, so as to be superimposed on the base station devices 30). In this way, the information processing device 10a can provide the user with information on the base station devices 30.

When a control target of the display controller 110 is a transparent liquid crystal display instead of the HUD device 16, the display controller 110 allows the transparent liquid crystal display to display the surrounding image IMe, and allows each image to be displayed at positions corresponding to the positions of the base station devices 30 in the real space indicated by the surrounding image IMe (that is, so as to be superimposed on the base station devices 30). In such a case, each image is an example of a "real space image".

In the state in which the images related to the base station devices 30 are being displayed by the display controller 110, the receiver 112 of the present embodiment recognizes an operation of an occupant (that is, a user) of the host vehicle M based on the image imaged by the in-vehicle camera 18 provided in the host vehicle M, and receives an instruction of the user. The instruction of the user is, for example, an operation of pointing the image VId related to a base station device 30 to which the information processing device 10a is connected. The communication controller 114 controls the communicator 15 to connect to the base station device 30 selected by the instruction of the user received by the receiver 112. When the image of the guide image IMn is selected by the instruction of the user received by the receiver 112, the route generator 116 generates a movement route RT from the position of the information processing device 10a acquired by the first acquirer 102 to the position of the base station device 30 corresponding to the guide image IMn.

Operation Flow

Figure 16:
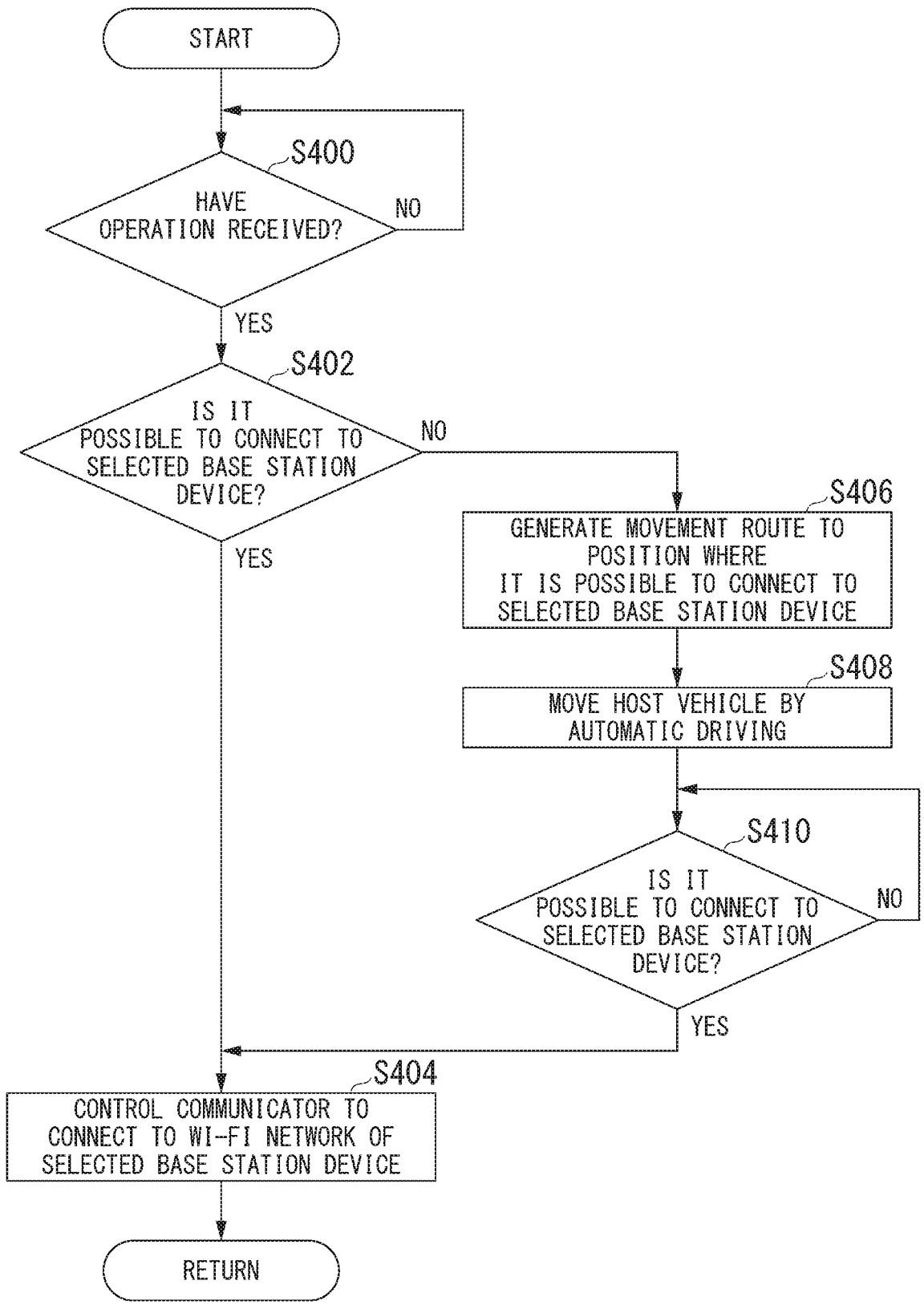
FIG. 16 is a flowchart illustrating the flow of a series of processes of connecting to a based station device based on an instruction of a user.

FIG. 16 is a flowchart illustrating the flow of a series of processes of connecting to the base station device 30 based on the instruction of the user. First, the receiver 112 determines whether the instruction of the user is received based on an operation of the occupant (that is, the user) of the host vehicle M, which is detected by a detection function unit, in the state in which the images related to the base station devices 30 are being displayed by the display controller 110 (step S400). The receiver 112 waits during a period in which the instruction of the user is received. When the instruction of the user is received by the receiver 112, the communication controller 114 determines whether it is possible to connect the communicator 15 to the base station device 30 related to the image VId selected by the user (step S402). When it is determined that it is possible to connect the communicator 15 to the base station device 30 related to the image VId selected by the user, the communication controller 114 controls the communicator 15 to connect to the Wi-Fi network provided by the base station device 30 (step S404).

When it is determined by the communication controller 114 that it is not possible to connect the communicator 15 to the base station device 30 related to the image VId selected by the user, the route generator 116 generates the movement route RT to the base station device 30 (step S406). The recommended lane determiner 171 determines a recommended lane based on the movement route RT generated by the route generator 116, and the vehicle controller 19 generates a target trajectory such that the host vehicle M travels along the recommended lane determined by the recommended lane determiner 171 and controls the travel driving force output device, the brake device, and the steering device provided in the host vehicle M, thereby moving the host vehicle M to the base station device 30 by automatic driving (step S408). The communication controller 114 determines whether it is a position where it is possible to connect the communicator 15 to the base station device 30 related to the image VId selected by the user (that is, whether the user has moved to the base station device 30, based on an image indicating the movement route RT) (step S410). When it is determined that it is possible to connect the communicator 15 to the base station device 30 related to the image VId selected by the user, the communication controller 114 controls the communicator 15 to connect to the Wi-Fi network provided by the base station device 30 (step S404).

Regarding Control of Communicator 15 Based on Communication Quality

In the above, although the case where the communication controller 114 controls the communicator 15 to connect to the Wi-Fi network provided by the base station device 30 selected by the operation or the instruction received by the receiver 112 has been described, the present invention is not limited thereto. For example, when the communication quality of the Wi-Fi network provided by the base station device 30 selected by the operation or the instruction received by the receiver 112 is equal to or more than a predetermined threshold, the communication controller 114 may control the communicator 15 to connect to the Wi-Fi network, and when the communication quality is under the predetermined threshold, the communication controller 114 may control the communicator 15 not to connect to the Wi-Fi network.

FIG. 17 is a flowchart illustrating an example of a process in which the communication controller 114 controls the communicator 15 based on the communication quality of the base station device 30. Among the processes illustrated in FIG. 17, the same processes as those illustrated in FIG. 16 are denoted by the same step numbers and a description thereof will be omitted. When the operation of the user is received by the receiver 112, the communication controller 114 determines, based on the records acquired by the second acquirer 104, whether the communication quality of the base station device 30 related to the image VId selected by the user is equal to or more than the predetermined threshold (step S412). When the predetermined threshold is, for example, communication quality "medium", the communication controller 114 determines whether the communication quality of the base station device 30 is "good" or "medium".

When the communication quality of the base station device 30 related to the image VId selected by the user is equal to or more than the predetermined threshold (that is, the communication quality is "good" or "medium"), the communication controller 114 proceeds the process to step S402. Since the subsequent processing is the same as FIG. 16, a description thereof will be omitted. When the communication quality of the base station device 30 related to the image VId selected by the user is under the predetermined threshold (that is, the communication quality is "low"), the communication controller 114 proceeds the process to step S400 and waits until a base station device 30, whose communication quality is equal to or more than the predetermined threshold, is selected by the user. Since the subsequent processing is the same as the aforementioned content, a description thereof will be omitted.

For example, when a base station device 30, whose communication quality is under the predetermined threshold, is selected, the display controller 110 may allow the HUD device 16 to display an image indicating a message for promoting the selection of another base station device 30. The process of step S412 may be performed when the "viewing device" is the HMI 14. Specifically, step S412 may be performed after the process of step S300 and before the process of step S302 in the aforementioned flowchart illustrated in FIG. 13.

Summary of Second Embodiment

As described above, the information processing device 10a of the present embodiment can provide the user with the information on the base station devices 30 by displaying any one of the images VId1 to VId3 on the HUD device 16.

Another Example of Surrounding Image IMe

In the aforementioned embodiments, although the case where the display controller 110 allows the liquid crystal display or the display device of the HMI 14 to display the surrounding image IMe and allows each image to be displayed at positions corresponding to the positions of the base station devices 30 indicated by the surrounding image IMe (that is, so as to be superimposed on the base station devices 30) has been described, the present invention is not limited thereto. The display controller 110 may use, for example, a virtual reality image in which a real space is reproduced, instead of the surrounding image IMe, and allow each image to be displayed at positions corresponding to the positions of the base station devices 30 in the real space indicated by the virtual reality image (that is, so as to be superimposed on the base station devices 30 in virtual reality). In such a case, each image is an example of "real space image".

Although a mode for carrying out the present invention has been described using the embodiments, the present invention is not limited to such embodiments and various modifications and substitutions can be made without departing from the spirit of the present invention.

What is claimed is:

1. An information processing device comprising:
a storage device that stores a program; and
one or more hardware processors,
wherein, using the one or more hardware processors that execute the program stored in the storage device, the information processing device is configured to:
acquire a position of the information processing device and a position of a base station device configured to provide a wireless communication network available by the information processing device;
control a viewing device based on the position of the information processing device and the position of the base station device such that a user visually recognizes an image superimposed on a real space and indicating presence of the base station device or the user visually recognizes a real space image in which a base station image indicating the presence of the base station device is included in an image indicating the real space or a virtual reality image in which the real space is reproduced; and
generate the image or the base station image so as to indicate communication quality of communication provided by the base station device,
wherein the information processing device further comprises:
a receiver configured to receive an operation of the user; and
a communicator configured to communicate with another device via a base station device,
wherein the one or more hardware processors control the communicator,
generate a movement route to the position of the base station device corresponding to the image,
control the communicator to connect to the base station device corresponding to the selected image or the base station image based on an operation of selecting the image received by the receiver or the base station image when communication quality of communication provided by the selected base station device is equal to or more than a predetermined threshold, and
generate the movement route to the position of the selected base station device based on the operation of selecting the image received by the receiver or the base station image when the communication quality of the communication provided by the selected base station device is under the predetermined threshold.

2. The information processing device according to claim 1,
wherein the one or more hardware processors treat the number of terminal devices connected to the base station device as information indicating the communication quality, and generate the image or the base station image.

3. The information processing device according to claim 1,
wherein the one or more hardware processors generate the image or the base station image in the form of a graphic in correspondence to each of a plurality of base station devices.

4. The information processing device according to claim 3,
wherein the one or more hardware processors generate the graphic in a form according to communication quality of communication provided by the plurality of base station devices.

5. The information processing device according to claim 3,
wherein the one or more hardware processors further derive a distance between the position of the base station device and the position of the information processing device, and make the graphic larger as the distance becomes shorter.

6. The information processing device according to claim 1, further comprising:
an imager configured to generate a surrounding image by imaging surroundings of the information processing device,
wherein the viewing device includes a display, and displays an image, in which the image is superimposed on the surrounding image generated by the imager, or the real space image in which the base station image is included in the surrounding image.

7. The information processing device according to claim 6,
wherein the one or more hardware processors specify the position of the base station device in the surrounding image based on the position of the base station device and an orientation of the information processing device, and allow the display to display an image, in which the image is displayed at the specified position of the base station device in the surrounding image, or the real space image in which the base station image is included at the specified position of the base station device.

8. The information processing device according to claim 1, further comprising:
a receiver configured to receive an operation of a user; and
a communicator configured to communicate with another device via a base station device,
wherein, based on an operation of selecting the image received by the receiver, the one or more hardware processors control the communicator to connect to the base station device corresponding to the selected image or the base station image.

9. The information processing device according to claim 1, further comprising:
a receiver configured to receive an operation of the user,
wherein, based on an operation of selecting the image received by the receiver or the base station image, the one or more hardware processors generate a movement route to the position of the base station device corresponding to the selected image or the base station image.

10. The information processing device according to claim 1, wherein the information processing device is further configured to acquire the position of the base station via a network.

11. The information processing device according to claim 1, wherein the information processing device is further configured to display the image or the base station image darker as the communication quality becomes better.

12. An information processing method implemented by a computer performing the steps of:
acquiring a position of an information processing device;
acquiring a position of a base station device configured to provide a wireless communication network available by the information processing device;
controlling a viewing device based on the acquired position of the information processing device and the acquired position of the base station device such that a user visually recognizes an image superimposed on a real space and indicating presence of the base station device or the user visually recognizes a real space image in which a base station image indicating the presence of the base station device is included in an image indicating the real space or a virtual reality image in which the real space is reproduced; and
generating the image or the base station image so as to indicate communication quality of communication provided by the base station device;
receiving an operation of the user;
communicating with another device via a base station device;
controlling the communicator;
generating a movement route to the position of the base station device corresponding to the image;
controlling the communicator to connect to the base station device corresponding to the selected image or the base station image based on an operation of selecting the image received by the receiver or the base station image when communication quality of communication provided by the selected base station device is equal to or more than a predetermined threshold; and
generating the movement route to the position of the selected base station device based on the operation of selecting the image received by the receiver or the base station image when the communication quality of the communication provided by the selected base station device is under the predetermined threshold.

13. The information processing method according to claim 12, wherein the computer further performs the step of acquiring the position of the base station via a network.

14. The information processing method according to claim 12, wherein the computer further performs the step of displaying the image or the base station image darker as the communication quality becomes better.

15. A computer readable non-transitory storage medium storing a program causing a computer to perform the steps of:
acquiring a position of an information processing device;
acquiring a position of a base station device configured to provide a wireless communication network available by the information processing device;
controlling a viewing device based on the acquired position of the information processing device and the acquired position of the base station device such that a user visually recognizes an image superimposed on a real space and indicating presence of the base station device or the user visually recognizes a real space image in which a base station image indicating the presence of the base station device is included in an image indicating the real space or a virtual reality image in which the real space is reproduced;
generating the image or the base station image so as to indicate communication quality of communication provided by the base station device;

receiving an operation of the user;
communicating with another device via a base station device;
controlling the communicator;
generating a movement route to the position of the base station device corresponding to the image;
controlling the communicator to connect to the base station device corresponding to the selected image or the base station image based on an operation of selecting the image received by the receiver or the base station image when communication quality of communication provided by the selected base station device is equal to or more than a predetermined threshold; and
generating the movement route to the position of the selected base station device based on the operation of selecting the image received by the receiver or the base station image when the communication quality of the communication provided by the selected base station device is under the predetermined threshold.

16. The computer readable non-transitory storage medium according to claim 15, wherein the program further causes the computer to perform the step of acquiring the position of the base station via a network.

17. The computer readable non-transitory storage medium according to claim 15, wherein the program further causes the computer to perform the step of displaying the image or the base station image darker as the communication quality becomes better.

* * * * *